US012585010B2

(12) United States Patent
Zeng et al.

(10) Patent No.: US 12,585,010 B2
(45) Date of Patent: Mar. 24, 2026

(54) CLASSIFICATION SYSTEMS AND METHODS FOR IN-VEHICLE SENSING WITH RADAR

(71) Applicant: Robert Bosch GmbH, Stuttgart (DE)

(72) Inventors: Yunze Zeng, San Jose, CA (US); Vivek Jain, Sunnyvale, CA (US)

(73) Assignee: Robert Bosch GmbH (DE)

( * ) Notice: Subject to any disclaimer, the term of this patent is extended or adjusted under 35 U.S.C. 154(b) by 757 days.

(21) Appl. No.: 17/894,786

(22) Filed: Aug. 24, 2022

(65) Prior Publication Data

US 2024/0069185 A1     Feb. 29, 2024

(51) Int. Cl.
*G01S 13/58*     (2006.01)
*G01S 13/931*     (2020.01)

(52) U.S. Cl.
CPC .......... *G01S 13/584* (2013.01); *G01S 13/931* (2013.01)

(58) Field of Classification Search
CPC .... G01S 13/343; G01S 13/584; G01S 13/931; B60R 21/015; B60R 21/01512; B60R 21/0153; B60R 21/01534
See application file for complete search history.

(56) References Cited

U.S. PATENT DOCUMENTS 5,118,134 A * 6/1992 Mattes ...................... G01P 3/68
                                               280/735
5,361,070 A * 11/1994 McEwan .............. A61B 5/0507
                                               342/21

5,653,462 A * 8/1997 Breed .................. B60N 2/2863
                                               180/272
5,835,613 A * 11/1998 Breed ...................... G01S 15/87
                                               382/104
6,266,593 B1 * 7/2001 Seip .................. B60R 21/01536
                                               701/45

(Continued)

FOREIGN PATENT DOCUMENTS

EP          4020009          6/2022

OTHER PUBLICATIONS

"Heatstroke Deaths of Children in Vehicles," https://www.noheatstroke.org, Updated Jul. 1, 2022. 7 Pages.

(Continued)

*Primary Examiner* — Peter M Bythrow
(74) *Attorney, Agent, or Firm* — Dickinson Wright PLLC

(57)          ABSTRACT

Systems and methods relate to in-vehicle sensing and classification via frequency modulated continuous wave (FMCW) radar. Radar reflection signals are received based on the radar transmission signals, and include a plurality of chirps across a plurality of frames. Range-FFT data is generated by performing a fast Fourier transform (FFT) on each chirp of a particular frame. Doppler-FFT data is generated by performing the FFT on the range-FFT data. Point cloud data of a radar subject is generated using the Doppler-FFT data. Doppler features, including a velocity of the radar subject, are extracted from the Doppler-FFT data. Classification data is generated to indicate a sensing state inside a vehicle based on the point cloud data and the Doppler features. The classification data includes class data that classifies the radar subject. A system response is generated to provide an action concerning the sensing state inside the vehicle based on the classification data.

20 Claims, 12 Drawing Sheets

(56) References Cited

U.S. PATENT DOCUMENTS

| | | | | |
|---|---|---|---|---|
| 6,507,779 B2* | 1/2003 | Breed | .................... | G01S 17/88 |
| | | | | 348/148 |
| 6,529,809 B1* | 3/2003 | Breed | .............. | B60R 21/01554 |
| | | | | 180/268 |
| 6,801,662 B1* | 10/2004 | Owechko | .............. | G06F 18/256 |
| | | | | 382/104 |
| 6,968,073 B1* | 11/2005 | O'Boyle | ................ | G06V 40/10 |
| | | | | 356/3 |
| 7,110,571 B2* | 9/2006 | Occhipinti | ........ | B60R 21/01538 |
| | | | | 382/104 |
| 7,243,945 B2* | 7/2007 | Breed | ................. | B60N 2/2863 |
| | | | | 180/274 |
| 7,415,126 B2* | 8/2008 | Breed | .............. | B60R 21/01542 |
| | | | | 701/44 |
| 7,526,120 B2* | 4/2009 | Gokturk | .............. | B60R 21/0152 |
| | | | | 382/106 |
| 7,570,785 B2* | 8/2009 | Breed | ................. | G06V 40/161 |
| | | | | 382/115 |
| 8,152,198 B2* | 4/2012 | Breed | .............. | B60R 21/01516 |
| | | | | 701/45 |
| 9,129,505 B2* | 9/2015 | Breed | ................ | G08B 21/0407 |
| 9,229,102 B1* | 1/2016 | Wright | ................. | G01S 13/885 |
| 9,290,146 B2* | 3/2016 | Breed | ................... | B60N 2/267 |
| 9,845,050 B1* | 12/2017 | Garza | ................ | G08B 21/0205 |
| 10,349,032 B2* | 7/2019 | Jemander | ............... | B60K 28/06 |
| 10,625,699 B2* | 4/2020 | Gramenos | ........... | B60N 2/4235 |
| 10,882,418 B2* | 1/2021 | Ewert | .............. | B60R 21/01512 |
| 11,230,293 B2* | 1/2022 | Gomez | ................. | G01S 13/18 |
| 11,536,801 B1* | 12/2022 | Li | ........................... | G01S 13/58 |
| 11,697,395 B2* | 7/2023 | Ben Abdelaziz | ....... | G01S 13/56 |
| | | | | 340/426.24 |
| 11,763,577 B2* | 9/2023 | Angermayer | ..... | B60R 21/01552 |
| | | | | 701/28 |
| 11,925,446 B2* | 3/2024 | Sarely | ................. | A61B 5/0022 |
| 12,189,724 B2* | 1/2025 | Roberts | ................... | G01V 9/00 |
| 2002/0003345 A1* | 1/2002 | Stanley | ............ | B60R 21/01532 |
| | | | | 280/728.1 |
| 2002/0059022 A1* | 5/2002 | Breed | .................... | G01S 15/42 |
| | | | | 701/45 |
| 2003/0036835 A1* | 2/2003 | Breed | .................... | G06V 40/10 |
| | | | | 701/45 |
| 2003/0209893 A1* | 11/2003 | Breed | .................... | B60N 2/267 |
| | | | | 701/45 |
| 2004/0153229 A1* | 8/2004 | Gokturk | .............. | B60R 21/0152 |
| | | | | 701/45 |
| 2006/0001298 A1* | 1/2006 | Tsuruta | ................ | B60N 2/0276 |
| | | | | 297/216.16 |
| 2010/0225764 A1* | 9/2010 | Nizko | .................... | G01S 13/04 |
| | | | | 348/152 |
| 2014/0097957 A1* | 4/2014 | Breed | .................... | G08B 21/06 |
| | | | | 340/576 |
| 2016/0200276 A1* | 7/2016 | Diewald | ................ | G01S 13/56 |
| | | | | 342/28 |
| 2016/0311388 A1* | 10/2016 | Diewald | ........... | B60R 21/01534 |
| 2018/0096475 A1* | 4/2018 | Jemander | ............... | H04N 7/183 |
| 2019/0018133 A1* | 1/2019 | Takada | .................... | G01S 13/56 |
| 2019/0366965 A1* | 12/2019 | Ben Khadhra | ....... | G01S 13/931 |
| 2020/0194115 A1* | 6/2020 | Chou | .................... | A61B 5/0077 |
| 2021/0016737 A1* | 1/2021 | Tokizaki | ............. | B60R 21/0134 |
| 2021/0245763 A1* | 8/2021 | Gomez | ................. | G01S 7/2883 |
| 2021/0293948 A1* | 9/2021 | Peng | .................... | G01S 13/345 |
| 2022/0095811 A1* | 3/2022 | Yetukuri | .............. | A47C 31/126 |
| 2022/0129687 A1* | 4/2022 | Munir | .................... | G06F 18/25 |
| 2022/0198205 A1* | 6/2022 | Raj | ........................ | G06V 20/59 |
| 2022/0234534 A1* | 7/2022 | Elad | .................... | H01Q 1/3233 |
| 2022/0404486 A1* | 12/2022 | Vagarappan Ulaganathan | ........... | G01S 13/584 |
| 2023/0026131 A1* | 1/2023 | Cordie | .................. | B60N 2/267 |
| 2023/0031035 A1* | 2/2023 | Olk | .................... | H01Q 15/0006 |
| 2023/0168364 A1* | 6/2023 | Podkamien | ............. | G01S 13/89 |
| | | | | 701/45 |
| 2024/0310478 A1* | 9/2024 | Sahara | .................... | G01S 13/32 |

OTHER PUBLICATIONS

"Euro NCAP 2025 Roadmap," https://cdn.euroncap.com/media/30700/euroncap-roadmap-2025-v4.pdf, Dated Sep. 12, 2017, 19 Pages.

"Creating a Global Market for Vehicle Safety," Global NCAP 2017, Retrieved Feb. 11, 2020 from http://www.globalncap.org/wp-content/uploads/2017/06/Market-for-Vehicle-Safety.pdf, 28 Pages.

Patel et al., "Deep Learning-based Object Classification on Automotive Radar Spectra," In 2019 IEEE Radar Conference (RadarConf), IEEE, 2019, pp. 1-6.

* cited by examiner

CLASSIFICATION SYSTEMS AND METHODS FOR IN-VEHICLE SENSING WITH RADAR

FIELD

This disclosure relates generally to computer-implemented systems and methods for in-vehicle sensing and classification based on frequency modulated continuous wave (FMCW) radar.

BACKGROUND

In general, there are a number of initiatives underway to address issues relating to the heatstroke deaths of children that occur when they are left behind in vehicles. For example, the European New Car Assessment Programme (EuroNCAP) plans on providing safety rating points for technical solutions that prevent the heatstroke deaths of unattended children in vehicles. While there are some solutions that use cameras when classifying objects in a vehicle, these camera-based solutions do not work effectively in a number of situations such as when there are occlusions, lighting issues inside the vehicle, etc. As non-limiting examples, for instance, these camera-based solutions may fail to determine that there is a child inside the vehicle when there is no line-of-sight between a camera and a child, when there is a blanket over the child, etc.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a method relates to in-vehicle sensing and classification via FMCW radar. The method includes transmitting, via a FMCW radar sensor, radar transmission signals. The method includes receiving, via the FMCW radar sensor, radar reflection signals based on the radar transmission signals. The radar reflection signals include a plurality of chirps across a plurality of frames. The method includes generating classification data based on the radar reflection signals to determine a sensing state inside a vehicle. The classification data includes class data that classifies a radar subject. The method includes generating a system response to provide an action concerning the sensing state based on the classification data.

According to at least one aspect, a system includes at least a transceiver module, a processor, and a non-transitory computer readable medium, which are in data communication with each other. The transceiver module is configured to operate with frequency modulated continuous wave (FMCW) radar. The transceiver module is located inside a vehicle. The transceiver module is operable to (i) transmit radar transmission signals, (ii) receive radar reflection signals based on the radar transmission signals, the radar reflection signals including a plurality of chirps across a plurality of frames, and (iii) convert the radar reflection signals into digital signals. The non-transitory computer readable medium includes instructions stored thereon that, when executed by the processor, causes the processor to perform a method, which includes generating first range data by performing a fast Fourier transform (FFT) on a first set of chirps of a first frame using the digital signals. The method includes generating second range data by performing the FFT on a second set of chirps of a second frame using the digital signals. The method includes generating Doppler data by performing the FFT on at least the first range data and the second range data. The method includes generating point cloud data of a radar subject using the Doppler data. The point cloud data includes location data of the radar subject. The method includes extracting Doppler features from the Doppler data. The Doppler features include a velocity of the radar subject. The method includes generating, via a classifier, classification data based on the point cloud data and the Doppler features to determine a sensing state inside the vehicle. The classification data includes class data that classifies the radar subject. The method includes generating a system response to provide an action concerning the sensing state of an interior region of the vehicle based on the classification data.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling within the spirit and scope of this disclosure.

Figure 1:
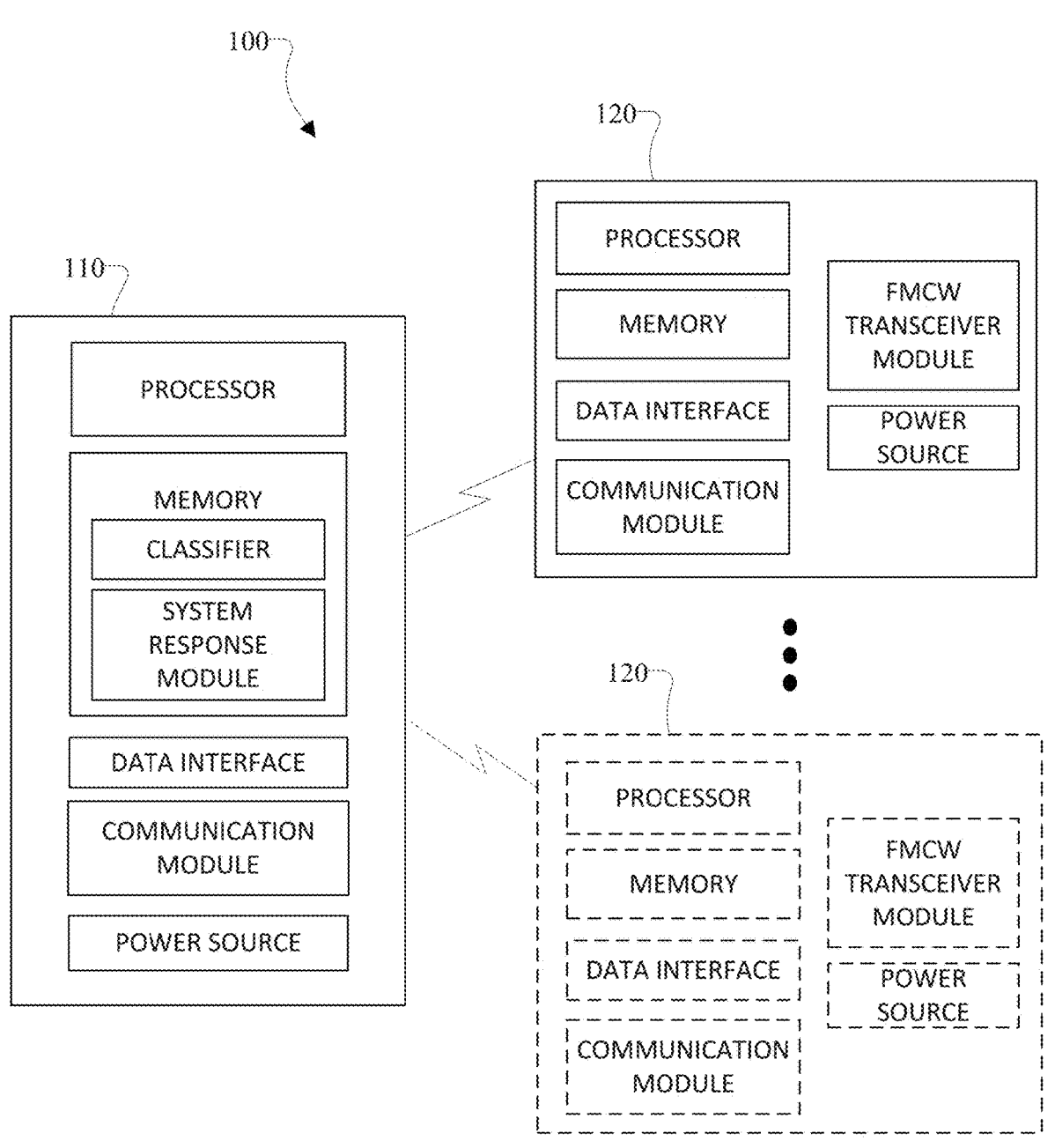
FIG. 1 is a block diagram of an example of a system for in-vehicle sensing and classification with FMCW radar according to an example embodiment of this disclosure.

FIG. 1 illustrates an example of a system 100 according to an example embodiment. The system 100 includes at least one control system 110 and at least one radar sensor 120. The system 100 is configured such that the control system 110 is in data communication with one or more radar sensors 120. In the event that there is more than one radar sensor 120, then the control system 110 is operable to manage the radar sensors 120 to ensure that they operate in an effective manner without interference among the radar sensors 120 and/or other communication devices (not shown) that relate to a vehicle 10.

In an example embodiment, the control system 110 includes one or more processors. The control system 110 may include a microcontroller. The control system 110 includes a memory system. The memory system includes at least one non-transitory computer readable medium, which has computer readable data including instructions for causing at least one processor to perform a method as set forth, for example, in at least FIG. 9, FIG. 10, FIG. 11, FIG. 12, or FIG. 13. Also, as an example, in FIG. 1, the memory system includes a classifier and a system response module, which is described with respect to at least FIG. 9, FIG. 10, FIG. 11, FIG. 12, or FIG. 13. The control system 110 includes at least one data interface and at least one communication module with communication technology to enable the control system 110 to communicate with other communication devices. The data interface may include one or more input/output (I/O) interfaces. The control system 110 may include communication technology that enables wired communication, wireless combination, or a combination thereof. The control system 110 is configured to communicate with one or more radar sensors 120. The control system 110 is also configured to communicate with one or more other technological components associated with the vehicle 10 to actuate one or more system responses based on a sensing state of the vehicle 10. In an example embodiment, for instance, the control system 110 comprises at least one electronic control unit (ECU), which is configured to communicate with other ECUs (e.g., airbag ECU, etc.) of the vehicle 10 to actuate one or more system responses based on the sensing state inside the vehicle 10 as indicated by classification data. The control system 110 includes a power source or a connection to a power source to supply power to the control system 110 and its components. As an example, for instance, the control system 110 may include a connection to a power source, such as the vehicle's battery and/or power system, which is separate from the control system 110. Additionally or alternatively, the control system 110 itself may include a battery as its own power source.

The radar sensor 120 is operable to transmit, receive, and process FMCW radar. In an example embodiment, for instance, the radar sensor 120 comprises an FMCW radar sensor that operates radar at wavelengths in the millimeter wave band. The radar sensor 120 includes one or more processors. The radar sensor 120 may include a central processing unit, multiple processing units, dedicated circuitry for achieving functionality, other processing technology, or any number and combination thereof. In an example embodiment, the radar sensor 120 includes a digital signal processor (DSP). The radar sensor 120 may include a microcontroller unit (MCU). The radar sensor 120 includes a memory system. The memory system includes at least one non-transitory computer readable medium, which has computer readable data including instructions for causing at least one processor to transmit, receive, and process FMCW radar signals as discussed in this disclosure. Also, the radar sensor 120 includes at least one data interface and at least one communication module with communication technology to enable the control system 110 to communicate with the control system 110 via wired communication, wireless communication, or a combination thereof. The data interface may include one or more I/O interfaces.

In addition, the radar sensor 120 includes at least one FMCW transceiver module. The FMCW transceiver module includes one or more antennas operable for FMCW radar communications. For example, the FMCW transceiver module may include an array of antennas. In this regard, the FMCW transceiver module includes a transmitter configured to transmit radar transmission signals and a receiver configured to receive radar reflection signals, which are based on the radar transmission signals. In addition, the FMCW transceiver module includes a mixer, which is configured to mix the radar transmission signal and the radar reception signal to generate an intermediate frequency (IF) signal. The FMCW transceiver module includes an analog-to-digital converter (ADC) to convert the radar signals (e.g., radar reception signals) from analog to digital. The FMCW transceiver module may include a filter, an amplifier, any suitable electronic component (e.g., signal processing component, computer component, etc.), or any number and combination thereof. In addition, the radar sensor 120 includes a power source or a connection to a power source to supply power to the radar sensor 120 and its components. As an example, for instance, the radar sensor 120 may include a connection to a power source, such as the vehicle's battery and/or power system, which is separate from the radar sensor 120. Additionally or alternatively, the radar sensor 120 itself may include a battery as its own power source.

Figure 2:
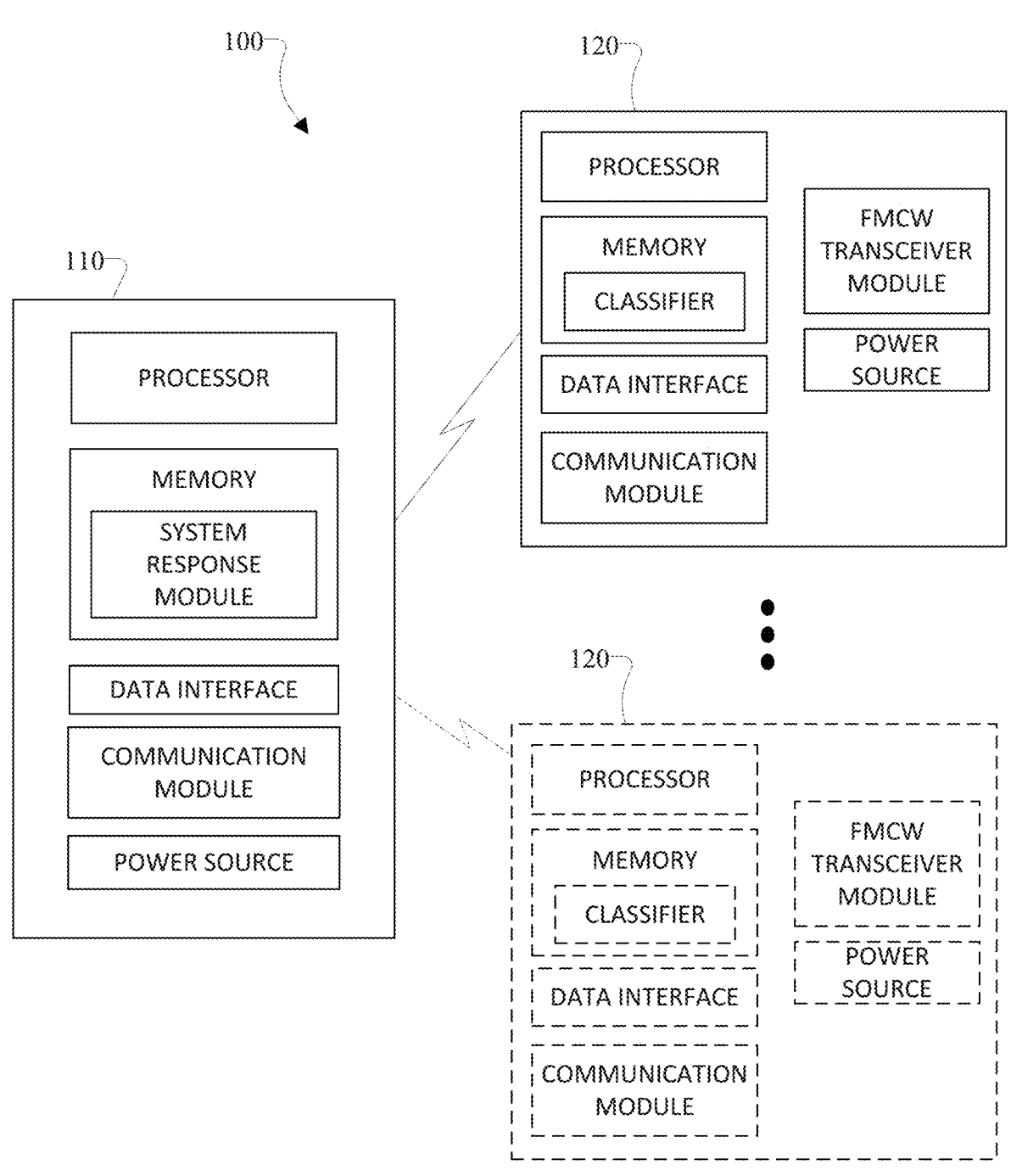
FIG. 2 is a block diagram of another example of a system for in-vehicle sensing and classification with FMCW radar according to an example embodiment of this disclosure.

FIG. 2 illustrates another example of the system 100 according to an example embodiment. The system 100 of FIG. 2 includes a number of features, which are the same as or similar to a number of the features of the system 100 of FIG. 1. For convenience, FIG. 1 may be referenced for a discussion of the features of FIG. 2 that are the same as or similar to the features of FIG. 1. Also, as shown, FIG. 2 differs from FIG. 1 with respect to the location of the classifier while providing the same functions. More specifically, the classifier of FIG. 1 is provided with respect to the control system 110 while the classifier of FIG. 2 is provided with respect to the radar sensor 120. The location of the classifier in the memory system associated with the control system 110 versus the location of the classifier in the memory system associated with the radar sensor 120 may be determined based on manufacturing, supplier, costs, other considerations, or any number and combination thereof.

Figure 3:
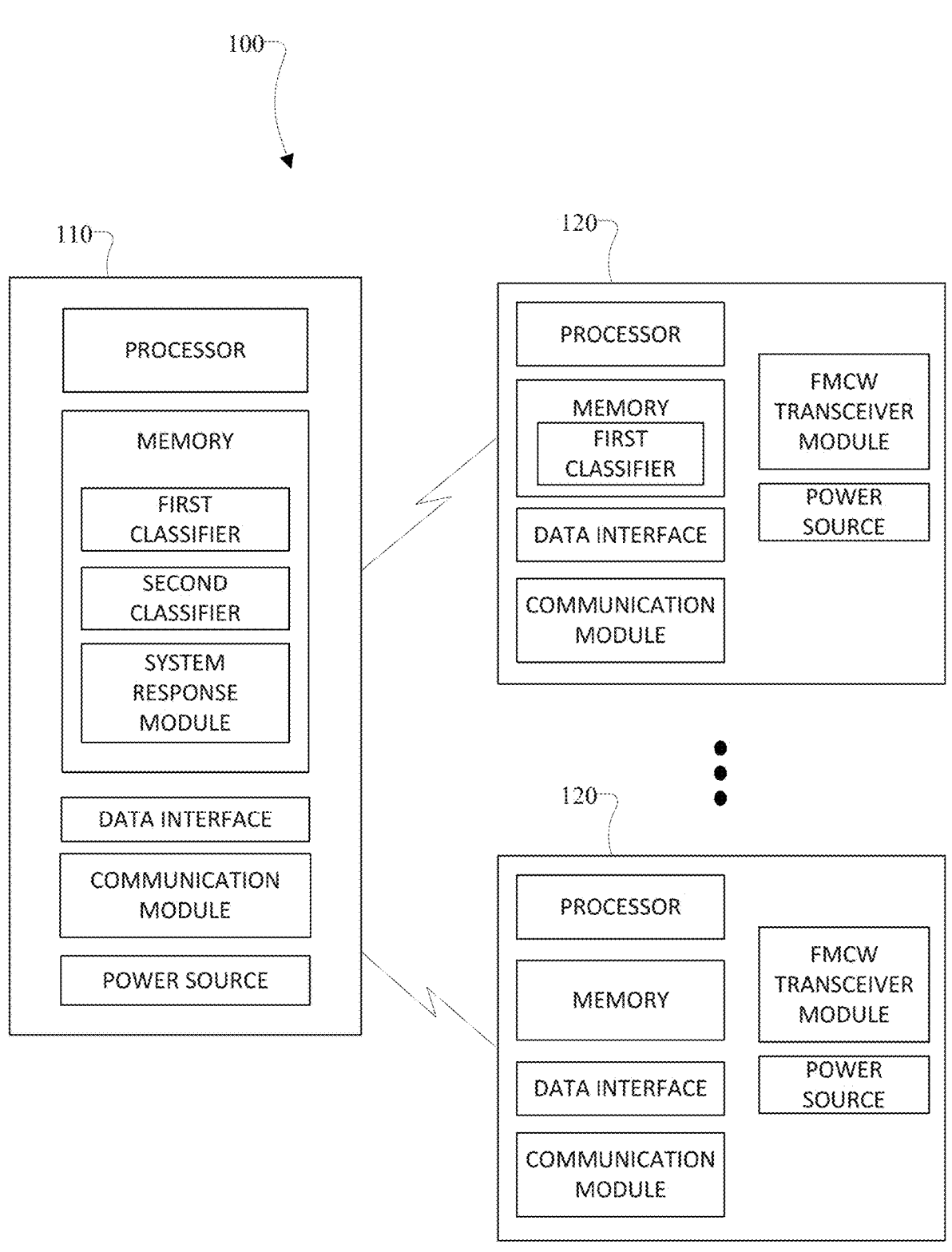
FIG. 3 is a block diagram of yet another example of a system for in-vehicle sensing and classification with FMCW radar according to an example embodiment of this disclosure.

FIG. 3 illustrates another example of the system 100 according to an example embodiment. The system 100 of FIG. 3 includes a number of features, which are the same as or similar to a number of the features of the system 100 of FIG. 1 and FIG. 2. For convenience, FIG. 1 and FIG. 2 may be referenced for a discussion of the features of FIG. 3 that are the same as or similar to the features of FIG. 1 and FIG. 2. Also, as shown, FIG. 3 differs from FIG. 1 and FIG. 2 with respect to the classifier. More specifically, in contrast to the classifier of FIG. 1 and the classifier of FIG. 2, the classifier of FIG. 3 includes at least a set of first classifiers and a second classifier. The set of first classifiers may include one or more first classifiers. Also, with respect to classification capability, the control system 110 may include (i) only a second classifier stored in the memory system or (ii) both a first classifier and a second classifier stored in the memory system.

Referring to FIG. 3, as an example, the control system 110 includes a memory system with at least one non-transitory computer readable medium, which has computer readable data including instructions for causing at least one processor and the classifier (i.e., the set of first classifiers and the second classifier) to perform classification as set forth in FIG. 9, FIG. 10, FIG. 11, FIG. 12, or FIG. 13. In FIG. 3, the control system 110 includes both the first classifier and the second classifier. By being configured with the first classifier and the second classifier, the control system 110 is configured to connect and operate with (i) one or more radar sensors 120 in which each radar sensor 120 includes the first classifier and (ii) one or more radar sensors 120 in which each radar sensor 120 does not include the first classifier. In this regard, for example, the control system 110 is configured to utilize only the second classifier in cases in which the radar sensor 120 (i) includes the first classifier and (ii) provides, via the first classifier, classification data to the control system 110. Upon receiving the classification data from each first classifier, the control system 110 is configured to generate, via the second classifier, classification data based on the classification data from each first classifier, thereby improving the accuracy and reliability of the classification performed by the system 100. Also, the control system 110 is configured to utilize both the first classifier and the second classifier in cases in which the radar sensor 120 (i) does not include the first classifier and (ii) provides radar data (e.g., raw ADC samples, etc.) to the control system 110. In this case, the control system 110 is configured, to (i) generate, via the first classifier, classification databased on the radar data from the radar sensor 120 without onboard classification capability and then (ii) generate, via the second classifier, classification data based on the classification data from each of the first classifiers, thereby improving the accuracy and reliability of the classification performed by the system 100. The system 100 of FIG. 3 is advantageous in that its architecture is flexible to accommodate various types of radar sensors 120 (e.g., radar sensors 120 with onboard classification capabilities and radar sensors 120 without onboard classification capabilities), and generate classification data based on these various types of radar sensors 120.

FIG. 4, FIG. 5, FIG. 6, FIG. 7, and FIG. 8 illustrate top plan views of non-limiting examples of various configurations for one or more radar sensors 120 of the system 100 with respect to a non-limiting example of a vehicle 10. These configurations are advantageous in allowing for easy installation of the radar sensors 120 while also providing sufficient coverage for performing in-vehicle sensing and classification with FMCW radar. Although these diagrams illustrate the vehicle 10 as being a car, the system 100 is configured to operate with any type of vehicle 10 (e.g., truck, bus, watercraft, aircraft, etc.). In this regard, the system 100 is configured to determine and generate a sensing state with respect to one or more radar sensing regions, which include at least one interior region of the vehicle 10. The interior region may include at least a cabin or a part of a cabin of the vehicle 10. The interior region may include a trunk 50 or a storage area of the vehicle 10. The interior region may include any vehicular location, which is disposed on or carried by the vehicle 10. For instance, in the examples shown in FIG. 4, FIG. 5, FIG. 6, FIG. 7, and FIG. 8, the interior region includes, at least partially, one or more seats (e.g., front driver seat 20, front passenger seat 30, backseat 40, etc.) of the vehicle 10 and/or any other part (e.g., floorboard area, console area, etc.) disposed within a vicinity of these one or more seats of the vehicle 10.

Figure 4:
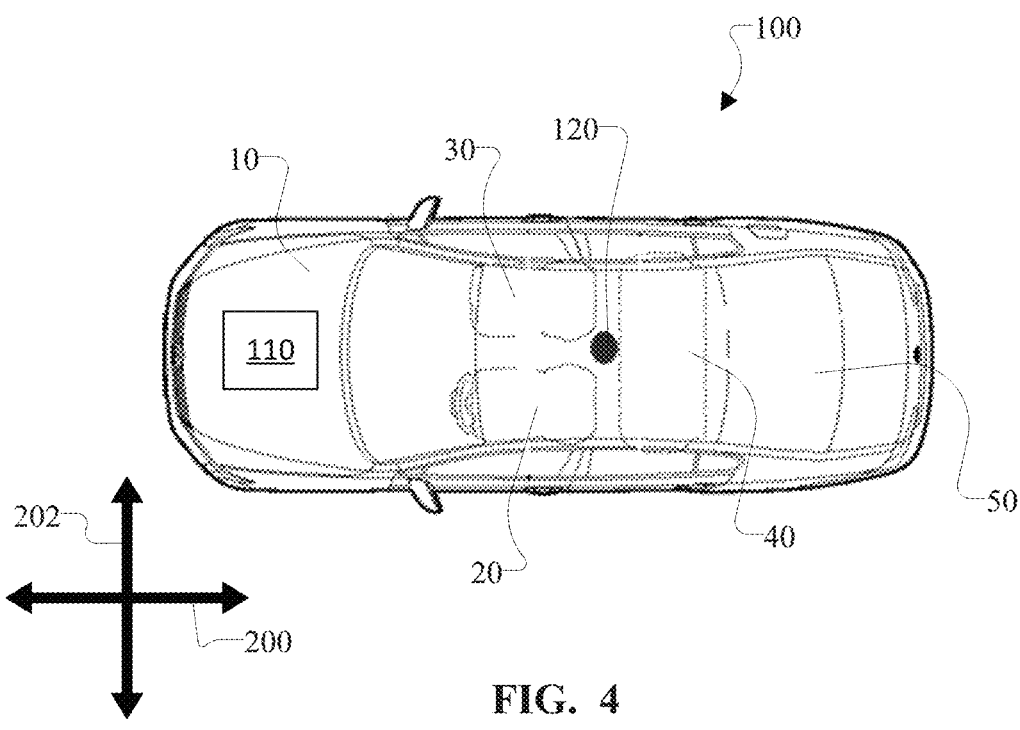
FIG. 4 is a top plan view of a system with a radar sensor located at a central region of a ceiling of a vehicle according to an example embodiment of this disclosure.

Also, as shown in each of FIG. 4, FIG. 5, FIG. 6, FIG. 7, and FIG. 8, the system 100 may include one or more radar sensors 120 at various locations inside the vehicle 10. Referring to FIG. 4, as an example, the system 100 includes at least one radar sensor 120 disposed on a ceiling (or interior side) of a roof portion of the vehicle 10. In FIG. 4, the radar sensor 120 is disposed at a central portion of the cabin of the vehicle 10. In this regard, for example, the radar sensor 120 is located along a longitudinal axis 200, which extends along a center or center portion of the vehicle 10. The radar sensor 120 is disposed on a center or central portion of a lateral axis 202 of the vehicle 10. In FIG. 4, the radar sensor 120 is disposed on a portion of the ceiling that is above and between the front seats (e.g., front driver seat 20 and front passenger seat 30) and the backseat 40. In this case, the system 100 is operable to determine and generate a sensing state for at least an entire interior region of a cabin particularly the front driver seat 20, the front passenger seat 30, and the backseat 40 of the vehicle 10, as well as areas around the front driver seat 20, the front passenger seat 30 and the backseat 40.

Figure 5:
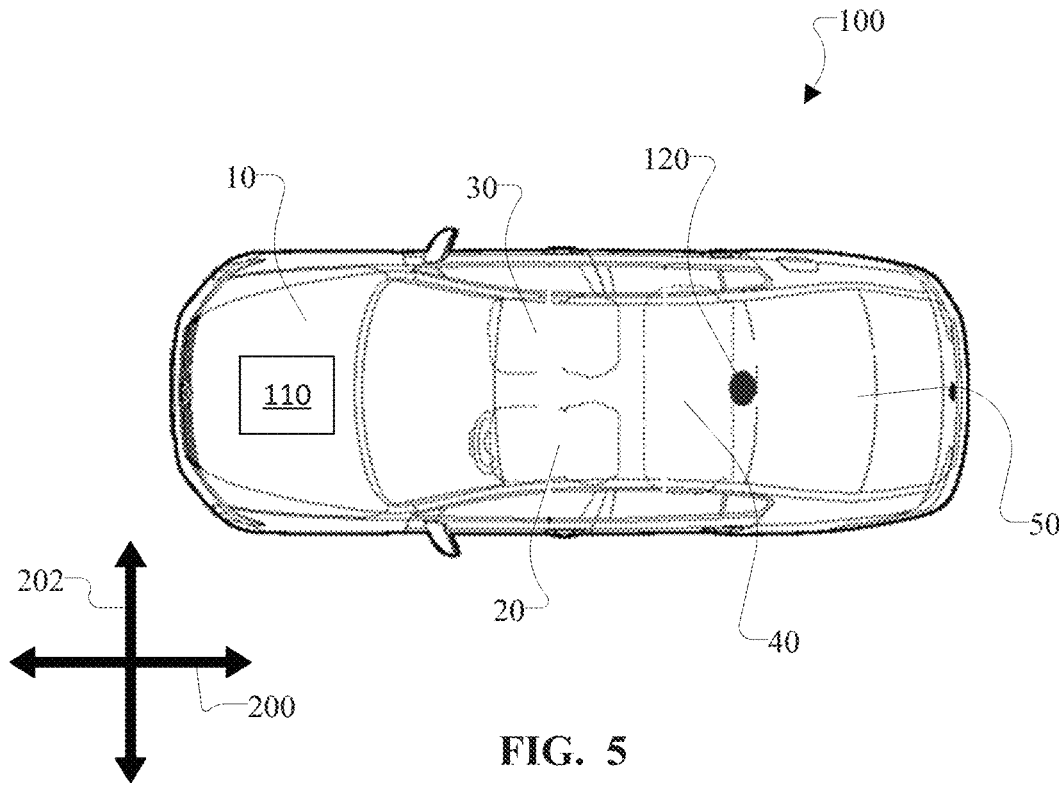
FIG. 5 is a top plan view of a system with a radar sensor located at a rear region of a ceiling of a vehicle according to an example embodiment of this disclosure.

Referring to FIG. 5, as another example, the system 100 includes at least one radar sensor 120 disposed on a ceiling (or interior side) of a roof portion of the vehicle 10. In FIG. 5, the radar sensor 120 is disposed at a rear portion of the cabin of the vehicle 10. In this regard, for example, the radar sensor 120 is located along a longitudinal axis 200, which extends along a center or center portion of the vehicle 10. The radar sensor 120 is disposed on a center or central portion of a lateral axis 202 of the vehicle 10. In FIG. 5, the radar sensor 120 is disposed on a portion of the ceiling that is above and between the backseat 40 and the trunk 50. In this case, the system 100 is operable to determine and generate a sensing state for at least an entire interior region of a cabin particularly the backseat 40, as well as areas around the backseat 40. The interior region may also include the trunk 50.

Figure 6:
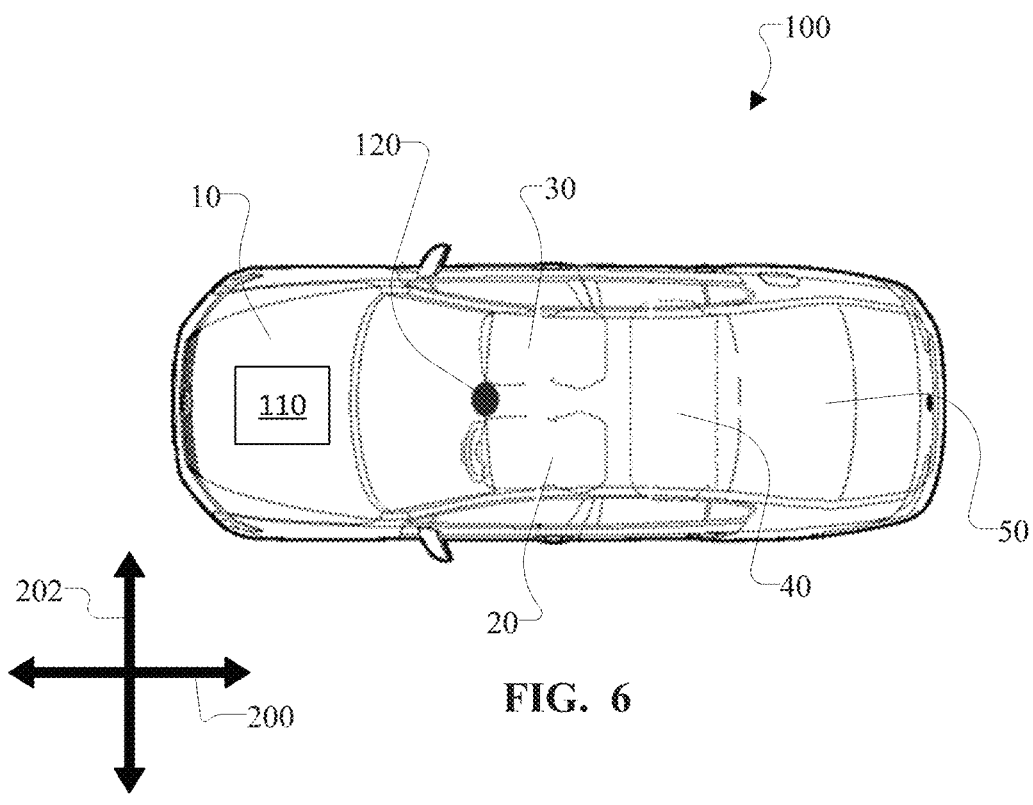
FIG. 6 is a top plan view of a radar sensor located within a vicinity of a rearview mirror of a vehicle according to an example embodiment of this disclosure.

Referring to FIG. 6, as an example, the system 100 includes at least one radar sensor 120 disposed on a ceiling (or interior side) of a roof portion of the vehicle 10. The radar sensor 120 is disposed at a front portion of the cabin of the vehicle 10. In this regard, for example, the radar sensor 120 is located along a longitudinal axis 200, which extends along a center or center portion of the vehicle 10. The radar sensor 120 is disposed on a center or central portion of a lateral axis 202 of the vehicle 10. The radar sensor 120 is disposed on a portion of the ceiling that is positioned at or adjacent to a rearview mirror of the vehicle 10. This placement of the radar sensor 120 may be beneficial for convertible vehicles or vehicles with sunroofs since a position of the radar sensor 120 is maintained even when there is a change in an open/closed state of the roof and/or the sunroof. In this case, the system 100 is operable to determine and generate a sensing state for at least an entire interior region of a cabin particularly the front seats (e.g., driver seat 20 and front passenger seat 30) of the vehicle 10, as well as areas around the front seats. This interior region may further include an interior section between the front windshield and the front seats of the vehicle 10.

Figure 7:
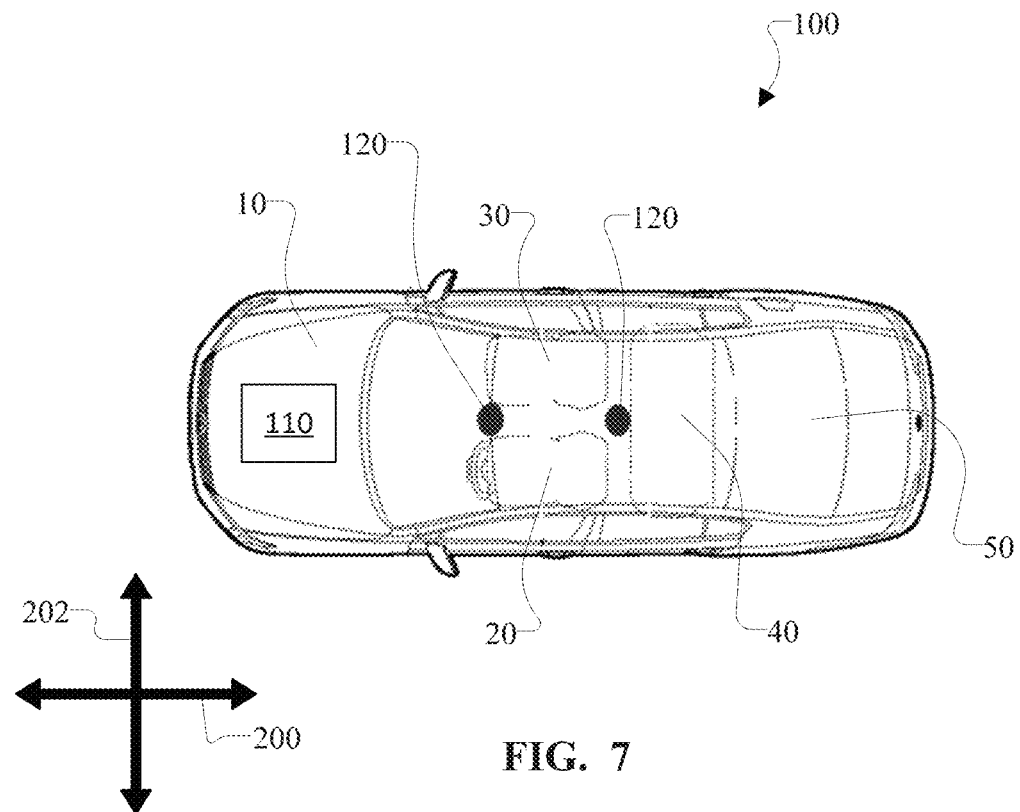
FIG. 7 is a top plan view of a system with a plurality of radar sensors including a radar sensor located within a vicinity of a rearview mirror and another radar sensor located at a central region of a ceiling of a vehicle according to an example embodiment of this disclosure.

Referring to FIG. 7, as another example, the system 100 includes at least a first radar sensor 120 and a second radar sensor 120, which are disposed on a ceiling (or interior side of roof portions) of the vehicle 10. In this non-limiting example, the first radar sensor 120 and the second radar sensor 120 are aligned along a longitudinal axis 200, which extends along a center or center portion of the vehicle 10. The first radar sensor 120 is disposed on a center or central portion of a first lateral axis 202 of the vehicle 10. The second radar sensor 120 is disposed on a center or central portion of a second lateral axis 202 of the vehicle 10. The first lateral axis 202 is parallel to the second lateral axis 202. More specifically, in FIG. 7, the first radar sensor 120 is disposed at a front portion of the cabin while the second radar sensor 120 is disposed at a center portion of the same cabin of the vehicle 10. In this non-limiting example, the first radar sensor 120 is disposed on a portion of the ceiling that is positioned at or adjacent to a rearview mirror of the vehicle 10. The second radar sensor 120 is disposed on a portion of the ceiling that is above and between the front seats (e.g., front driver seat 20 and front passenger seat 30) and the backseat 40. This configuration of the first radar sensor 120 and the second radar sensor 120 provides greater accuracy, greater reliability, and better performance than a configuration having only a single radar sensor 120.

In FIG. 7, the system 100 is operable to determine and generate a sensing state for at least an entire cabin of the vehicle 10 via a plurality of radar sensors 120, which include at least the first radar sensor 120 and the second radar sensor 120. The system 100 is operable, via the first radar sensor 120, to determine and generate a sensing state for at least a first interior region, which includes the front seats (e.g., driver seat 20 and front passenger seat 30) of the vehicle 10, as well as areas around the front seats. The first interior region may also include a region between the front windshield and the front seats of the vehicle 10. In addition, the system 100 is also operable to determine and generate a sensing state for at least a second interior region, which includes the front seats (e.g., driver seat 20 and front passenger seat 30) and the backseat 40 (e.g., rear left seat, rear middle seat, and rear right seat) of the vehicle 10, as well as areas around the front seats and the backseat. Also, with this configuration of radar sensors 120, the system 100 is also configured to provide sensing with respect to one or more other seats (e.g., a third row of vehicle seats), which are not shown in FIG. 7, but may be provided as a part of this vehicle 10 or another vehicle 10 (e.g., minivan). The system 100 is also configured to manage and control the first radar sensor 120 and the second radar sensor 120 to ensure that they operate effectively without interference.

Figure 8:
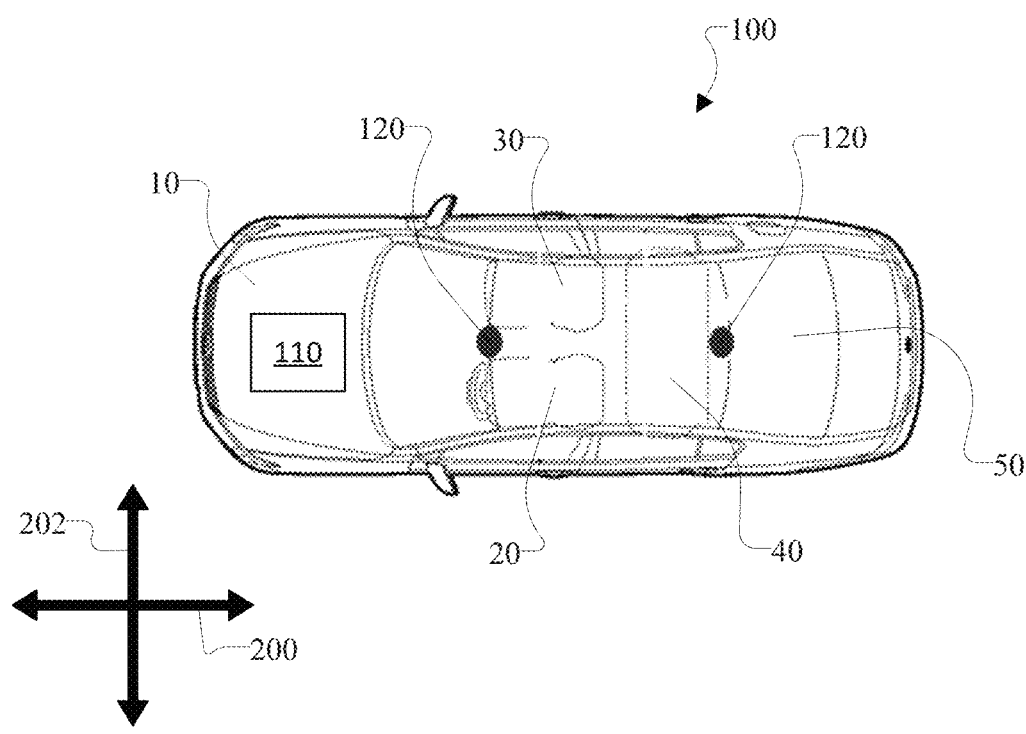
FIG. 8 is a top plan view of a system with a plurality of radar sensors including a radar sensor located within a vicinity of a rearview mirror and another radar sensor located at a rear region of a ceiling of a vehicle according to an example embodiment of this disclosure.

Referring to FIG. 8, as yet another example, the system 100 includes at least a first radar sensor 120 and a second radar sensor 120, which are disposed on a ceiling (or an interior side of roof portions) of the vehicle 10. In this non-limiting example, the first radar sensor 120 and the second radar sensor 120 are aligned along a longitudinal axis 200, which extends along a center or center portion of the vehicle 10. The first radar sensor 120 is disposed on a center or central portion of a first lateral axis 202 of the vehicle 10. The second radar sensor 120 is disposed on a center or central portion of a second lateral axis 202 of the vehicle 10. The first lateral axis 202 is parallel to the second lateral axis 202. More specifically, in FIG. 8, the first radar sensor 120 is disposed at a front portion of the cabin while the second radar sensor 120 is disposed at a rear portion of the same cabin of the vehicle 10. In this non-limiting example, the first radar sensor 120 is disposed on a portion of the ceiling that is positioned at or adjacent to a rearview mirror of the vehicle 10. The second radar sensor 120 is disposed on a portion of the ceiling that is above and between the backseat 40 (e.g., rear left seat, rear middle seat, and rear right seat) and the trunk 50. In this case, the system 100 is operable to determine and generate a sensing state for at least an entire cabin of the vehicle 10 via the first radar sensor 120 and the second radar sensor 120. The trunk may also be included in this sensing state. This configuration of the first radar sensor 120 and the second radar sensor 120 provides greater accuracy, greater reliability, and better performance than a configuration having only a single radar sensor 120.

In FIG. 8, the system 100 is operable to determine and generate a sensing state for an entire cabin of the vehicle 10 via the first radar sensor 120 and the second radar sensor 120. More specifically, for example, the system 100 is operable to determine and generate a sensing state for at least a first interior region, via the first radar sensor 120, and a second interior region, via the second radar sensor 120. The first interior region includes the front seats (e.g., driver seat 20 and front passenger seat 30), as well as areas around the front seats of the vehicle 10. The first interior region may also include a region between the front windshield and the front seats of the vehicle 10. The second interior region includes the backseat 40 (e.g., rear left seat, rear middle seat, and rear right seat) of the vehicle 10, as well as areas around the backseat 40. The interior region may also include the trunk 50. Also, with this configuration of radar sensors 120, the system 100 is also configured to provide sensing with respect to one or more other seats (e.g., a third row of vehicle seats), which are not shown in FIG. 7, but may be provided as a part of this vehicle 10 or another vehicle 10 (e.g., minivan). The system 100 is also configured to manage and control the first radar sensor 120 and the second radar sensor 120 to ensure that they operate effectively without interference. Further, with this configuration of radar sensors 120, the system 100 is configured to offer greater robustness in occupancy detection for both front-facing and rear-facing children in car seats.

As described above, the system 100 includes one or more radar sensors 120 located with respect to the vehicle 10 such that the one or more radar sensors 120 are operable to sense one or more interior regions of the vehicle 10. FIG. 4, FIG. 5, FIG. 6, FIG. 7, and FIG. 8 illustrate non-limiting examples of locations of the radar sensors 120, which provide for relatively easy installation and sufficient coverage for in-vehicle sensing and classification. The system 100 is not limited to providing one or more radar sensors 120, which are positioned at the one or more of the locations shown in FIG. 4, FIG. 5, FIG. 6, FIG. 7, and FIG. 8. Additionally or alternatively, one or more radar sensors 120 may be installed on one or more pillars (e.g., B-pillar, C-pillar, etc.) of the vehicle 10 to determine left-side and/or right-side passenger occupancy, respectively. The system 100 is configured to utilize this passenger occupancy information directly or indirectly from one or more of these radar sensors 120 to deploy side airbags. In other words, the system 100 may include one or more radar sensors 120 at any location that is within or around at least a part that is associated with or carried by the vehicle 10 to monitor a sensing state of the desired interior portion of the vehicle 10 such that the appropriate system response may be provided based on a sensing state inside the vehicle 10. In one or more embodiments, the sensing state is determined and/or provided by the classification data.

Figure 9:
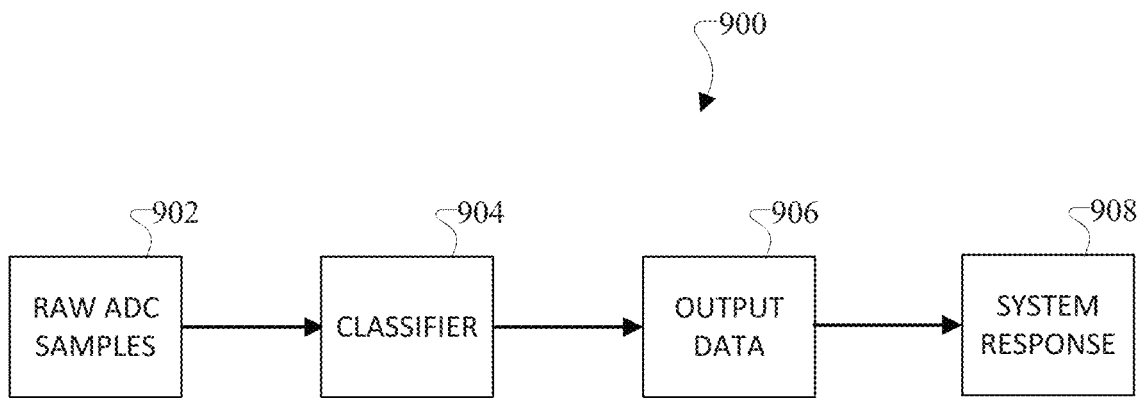
FIG. 9 is a flow diagram of a first example of a process for in-vehicle sensing and classification with FMCW radar according to an example embodiment of this disclosure.

FIG. 9 illustrates a pipeline 900 with a number of phases, which include a number of operations that are performed by one or more processors of the system 100 based on FMCW radar. The pipeline 900 is not limited to the phases shown in FIG. 9. In this regard, the pipeline 900 may include more phases or less phases than that shown in FIG. 9 provided that the system 100 is operable to perform the functions as described herein.

At phase 902, according to an example, the system 100 obtains raw radar samples via one or more radar sensors 120. More specifically, for example, the radar sensor 120 is configured to transmit radar transmission signals and receive radar reflection signals for FMCW radar. In each of these cases, the signal frequency is increasing or decreasing (e.g., linearly increasing/decreasing) and is known as a chirp 1402, as shown, for example, in FIG. 14. In this regard, the radar sensor 120 is operable to transmit one or more radar transmission signals as one or more chirps 1402. Also, the radar sensor 120 is operable to receive one or more radar reception signals as one or more chirps 1402. For example, the radar sensor 120 is configured to transmit a chirp 1402 as the radar transmission signal, and then receive a reflected chirp 1402 as the radar reception signal. In this regard, the radar reception signal may be a delayed version of the radar transmission signal.

The basic unit of radar data, which is transmitted and received by the radar sensor 120, may be referred to as a frame 1400. A frame 1400 includes a number of chirps 1402, as defined in a radar configuration file. For example, each frame 1400 may include a set of chirps 1402. The frame 1400 is defined based on a number of radar transmission signals, a number of radar reception signals, a number of chirp loops, a number of digital samples per chirp 1402, any suitable feature, or any number and combination thereof. Also, the radar sensor 120 includes a mixer to mix the radar transmission signal and the radar reception signal to generate an IF signal. In addition, the radar sensor 120 includes an ADC to convert the radar reception signals to digital signals.

At phase 904, according to an example, the system 100 provides the raw ADC samples or the digital signals to a classifier. The digital signals may be pre-processed to provide input data to the classifier in a suitable format and/or to improve the quality of the signals. The classifier includes one or more software systems (and/or hardware systems) to classify the input data and/or generate classification data. For example, the classifier may include one or more machine learning systems. The one or more machine learning systems may include one or more machine learning models. For example, the classifier may include logistic regression, support vector machine (SVM), decision trees, random forests, eXtreme Gradient Boosting (XGBoost), convolutional neural network (CNN), random neural network (RNN), a long short-term memory (LSTM), a transformer, an artificial neural network, any classification technology, or any number and combination thereof. Additionally or alternatively, the classifier may include one or more classification models, via software technology and/or hardware technology, which are rule-based, policy-driven, and/or developed such that a training phase and/or training data is not necessary to generate the classification data.

At phase 906, according to an example, the system 100 generates output data via the classifier. In this regard, for example, the classifier is configured to generate output data that includes classification data. As an example, for instance, the classification data includes class data with at least one class label that is indicative of and/or identifies at least one radar detection or at least one radar subject with respect to the input data. More specifically, as a non-limiting example, for instance, the system 100, via the classifier, is operable to generate (i) an animate label when the radar subject is classified as being animate and (ii) an inanimate label when the radar subject is classified as being inanimate. Additionally or alternatively, the system 100, via the classifier, is operable to generate (i) an adult label when the radar subject is classified as being an adult (ii) a child label when the radar subject is classified as being a child, and (iii) a baby label when the radar subject is classified as being a baby. Additionally or alternatively, the system 100, via the classifier, is operable to generate (i) an adult label when the radar subject is classified as being an adult, (ii) a child label when the radar subject is classified as being a child, and, (iii) a baby label when the radar subject is classified as being a baby, and (iv) a pet label when the radar subject is classified as being a pet. Additionally or alternatively, the system 100, via the classifier, is operable to generate (i) a human label when the radar subject is classified as being a human, (ii) a pet label when the radar subject is classified as being a pet, and (iii) an inanimate label when the radar subject is classified as being inanimate. Additionally or alternatively, the system 100, via the classifier, is operable to generate (i) an adult label when the radar subject is classified as being an adult, (ii) a child label when the radar subject is classified as being a child, (iii) a baby label when the radar subject is classified as being a baby, (iv) a pet label when the radar subject is classified as being a pet, (v) a backpack label when the radar subject is classified as a backpack, luggage, a bag, or the like, (vi) baby car seat label when the radar subject is classified as a baby car seat, (vii) a box label when the radar subject is classified as being a box or package. The system 100, via the classifier, is configured to generate more class labels or less class labels indicative of radar subjects than that discussed above depending upon a number of factors associated with that vehicle 10.

Additionally or alternatively to the class label, for instance, the classification data may include a situation label that is indicative of and/or identifies at least one situation of at least one radar detection or at least one radar subject with respect to the input data. For example, the system 100, via the classifier, is operable to generate a normal situation label, an intrusion situation label, and an emergency situation label. The normal situation label is generated when there is no radar subject and/or no input data that constitutes an intrusion or emergency. For example, the normal situation label may be generated when the input data is determined to be relatively static. The intrusion situation label is generated when at least one radar subject and/or input data is classified as an intrusion. The emergency situation label is generated when the input data includes at least one radar subject and/or input data is classified as an emergency situation (e.g., a medical emergency, an accident, a fight, etc.). The system 100, via the classifier, is configured to generate more situation labels or less situation labels than that discussed above depending upon a number of factors associated with that vehicle 10.

At phase 908, according to an example, the system 100 generates a system response and/or control data for activating a system response based on the classification data, which includes class data with at least the class label. In addition, the system 100 is configured to generate other applicable data, such as location data (e.g. positions of radar subjects inside the vehicle 10), headcount data (e.g., number of humans inside the vehicle 10, number of pets inside the vehicle 10, number of children inside the vehicle 10, etc.), inventory data (e.g., number and/or names of objects inside the vehicle 10), or any supplemental data regarding the classification data, the vehicle interior (e.g. cabin temperature, etc.), the vehicle 10 itself, any relevant data (e.g., weather data, map data, etc.), or any combination thereof. In this regard, the system 100 is may also take into account various applicable data while generating the system response based on the classification data.

The control system 110 is operable to generate a system response, which includes or more actions relating to a sensing state inside the vehicle 10 or around one or more predetermined regions of the vehicle 10 as indicated by the classification data. For example, the system response may include generating an alert notification when the class label indicates that an animate subject (e.g. child, baby, pet, human, etc.) is in the vehicle 10 when the vehicle 10 has been parked for a predetermined time period. The system response may include generating an alert notification and/or activating an alarm when the situation label indicates that there is an intrusion situation or an emergency situation. The alert notification may include transmitting a message (e.g., email, text message, voice message, etc.), via communication technology (e.g., phone, computer, etc.), to the appropriate entity (e.g., vehicle owner, vehicle driver, vehicle passenger, emergency responder, police, medical responder, etc.). The alarm may include activation of an alarm (e.g., auditory alarm, visual alarm, etc.) of the vehicle 10 or another communication device (e.g., mobile phone) when the situation label indicates an intrusion situation or emergency situation.

The system response may include actions relating to one or more components of the vehicle 10. In this regard, the one or more components may include an electronic component, a computer component, a mechanical component, or any number and combination thereof. For example, the system 100 is configured to generate control data for a system response, which includes controlling deployment of an airbag associated with a seat inside the vehicle 10 based on the class data of that seat. More specifically, for instance, the system response includes activating or enabling deployment of an airbag associated with a seat when the class data indicates or suggests that the radar subject located at the seat is a human (e.g., a human, an adult, etc.). Also, the system response includes deactivating or disabling deployment of an airbag associated with a seat inside the vehicle when the class data indicates or suggests that the radar subject at that seat is not human (e.g., box, backpack, etc.). As another example, the system response may include activating a seatbelt reminder alert when the class label indicates or suggests that a human (e.g., human, an adult, child, baby, etc.) is located at a seat when a seatbelt of the seat is not fastened. The aforementioned system responses are examples of the various actions that may be taken based on the output data of the classifier. The system 100 is not limited to these system responses, as the system 100 may generate a number of other system responses based on the classification data, which may be enhanced by other applicable data (e.g., such as location data to specify that the radar subject is in the middle rear seat of the vehicle 10). Also, the system 100 may generate more than one system response based on the classification data. For example, the system 100 may be configured to generate an alert notification (e.g., text message, email, phone call, etc.) to one or more predetermined entities (e.g., vehicle owner, emergency responder, etc.) and generate an audible alarm (e.g., vehicle alarm system) when the class label indicates that the radar subject is a human and the situation label indicates that the situation is classified as an intrusion or an emergency.

Figure 10:
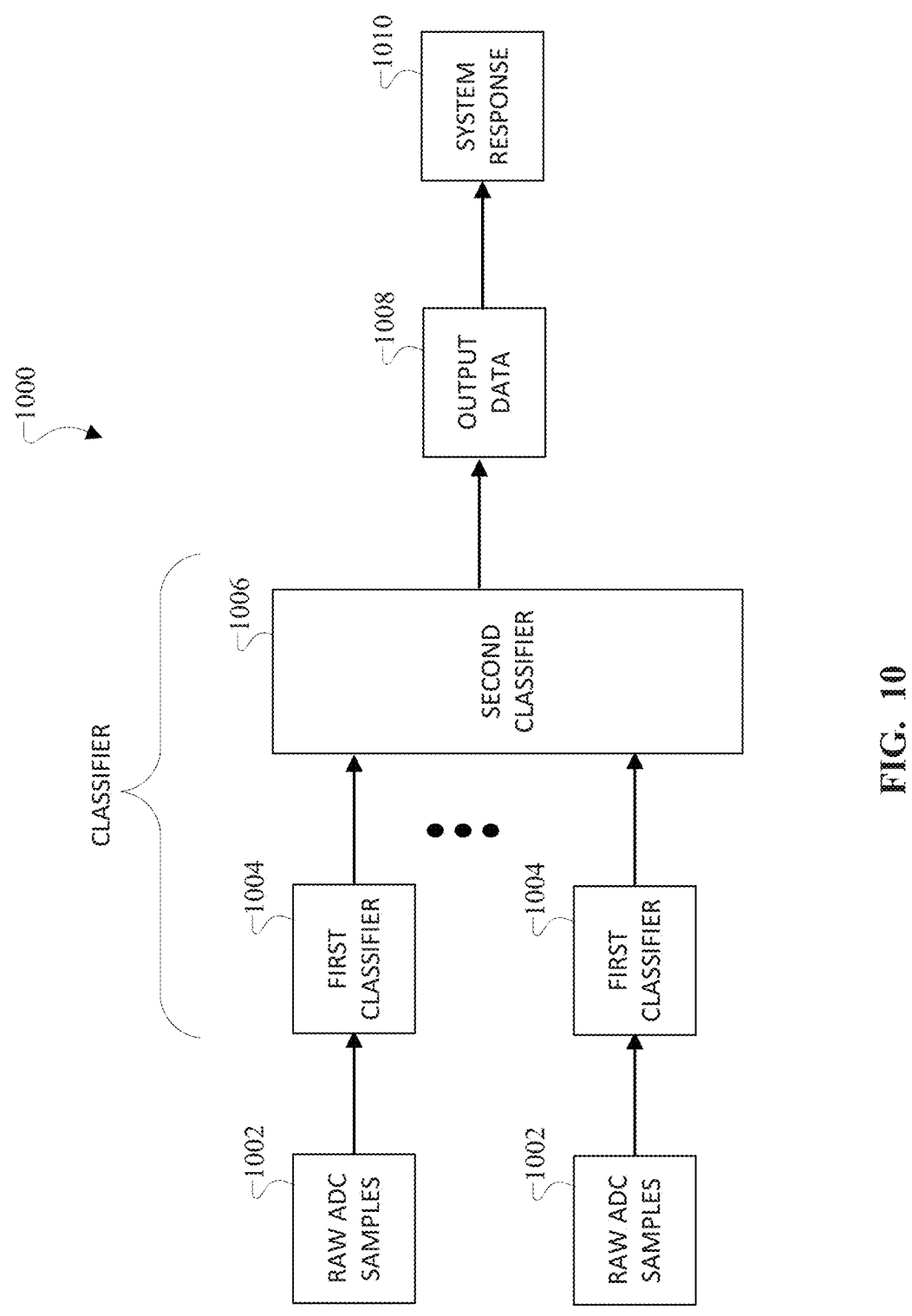
FIG. 10 is a flow diagram of a second example of a process for in-vehicle sensing and classification with FMCW radar according to an example embodiment of this disclosure.

FIG. 10 illustrates a pipeline 1000 with a number of phases, which include a number of operations that are performed by one or more processors of the system 100 based on FMCW radar. The pipeline 1000 is not limited to the phases shown in FIG. 10. In this regard, the pipeline 1000 may include more phases or less phases than that shown in FIG. 10 provided that the system 100 is operable to perform the functions as described herein.

Figure 14:
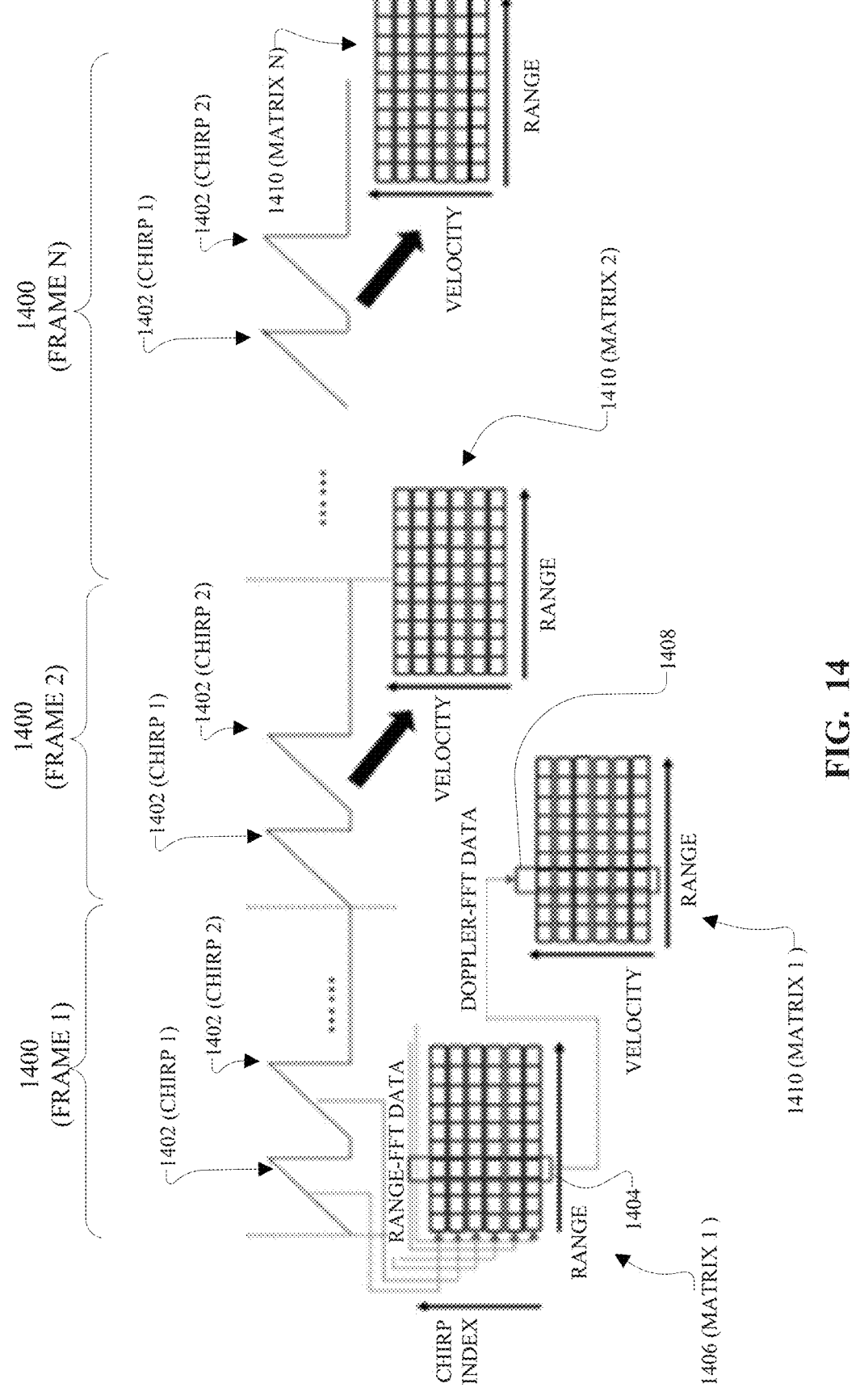
FIG. 14 is a conceptual diagram that shows a non-limiting example of the generation of range data and the generation of Doppler features according to an example embodiment of this disclosure.

At phase 1002, according to an example, the system 100 obtains raw radar samples via one or more radar sensors 120. More specifically, for example, the radar sensor 120 is configured to transmit radar transmission signals and receive radar reflection signals for FMCW radar. In each of these cases, the signal frequency is increasing or decreasing (e.g., linearly increasing/decreasing) and is known as a chirp 1402 (FIG. 14). In this regard, the radar sensor 120 is operable to transmit one or more radar transmission signals as one or more chirps 1402. Also, the radar sensor 120 is operable to receive one or more radar reception signals as one or more chirps 1402. For example, the radar sensor 120 is configured to transmit a chirp 1402 as the radar transmission signal, and then receive a reflected chirp 1402 as the radar reception signal. In this regard, the radar reception signal may be a delayed version of the radar transmission signal.

The basic unit of radar data, which is transmitted and received by the radar sensor 120, may be referred to as a frame 1400 (FIG. 14). A frame 1400 includes a number of chirps 1402, as defined in a radar configuration file. For example, each frame 1400 may include a plurality of chirps 1402. The frame 1400 is defined based on a number of radar transmission signals, a number of radar reception signals, a number of chirp loops, a number of digital samples per chirp 1402, any suitable feature, or any number and combination thereof. Also, the radar sensor 120 includes a mixer to mix the radar transmission signal and the radar reception signal to generate an IF signal. In addition, the radar sensor 120 includes an ADC that converts the radar reception signals to digital signals.

At phase 1004, according to an example, the system 100 provides the raw ADC samples or the digital signals to a first classifier. The digital signals may be pre-processed to provide input data to the first classifier in a suitable format and/or to improve the quality of the signals. The first classifier includes one or more software systems (and/or hardware systems) to classify the input data and/or generate classification data. For example, the first classifier may include one or more machine learning systems. The one or more machine learning systems may include one or more machine learning models. For example, the first classifier may include logistic regression, support vector machine (SVM), decision trees, random forests, eXtreme Gradient Boosting (XGBoost), convolutional neural network (CNN), random neural network (RNN), a long short-term memory (LSTM), a transformer, an artificial neural network, any classification technology, or any number and combination thereof. Additionally or alternatively, the first classifier may include one or more classification models, via software technology and/or hardware technology, which are rule-based, policy-driven, and/or developed such that a training phase and/or training data is not necessary to generate the classification data.

The first classifier is configured to generate classification data. As an example, for instance, the classification data includes class data with at least one class label that is indicative of and/or identifies at least one radar detection or at least one radar subject with respect to the input data. More specifically, as a non-limiting example, for instance, the system 100, via the first classifier, is operable to generate (i) an animate label when the radar subject is classified as being animate and (ii) an inanimate label when the radar subject is classified as being inanimate. Additionally or alternatively, the system 100, via the first classifier, is operable to generate (i) an adult label when the radar subject is classified as being an adult (ii) a child label when the radar subject is classified as being a child, and (iii) a baby label when the radar subject is classified as being a baby. Additionally or alternatively, the system 100, via the first classifier, is operable to generate (i) an adult label when the radar subject is classified as being an adult, (ii) a child label when the radar subject is classified as being a child, and, (iii) a baby label when the radar subject is classified as being a baby, and (iv) a pet label when the radar subject is classified as being a pet. Additionally or alternatively, the system 100, via the first classifier, is operable to generate (i) a human label when the radar subject is classified as being a human, (ii) a pet label when the radar subject is classified as being a pet, and (iii) an inanimate label when the radar subject is classified as being inanimate. Additionally or alternatively, the system 100, via the first classifier, is operable to generate (i) an adult label when the radar subject is classified as being an adult, (ii) a child label when the radar subject is classified as being a child, (iii) a baby label when the radar subject is classified as being a baby, (iv) a pet label when the radar subject is classified as being a pet, (v) a backpack label when the radar subject is classified as a backpack, luggage, a bag, or the like, (vi) baby car seat label when the radar subject is classified as a baby car seat, (vii) a box label when the radar subject is classified as being a box or package. The system 100, via the first classifier, is configured to generate more class labels or less class labels indicative of radar subjects than that discussed above depending upon a number of factors associated with that vehicle 10.

Additionally or alternatively to the class label, for instance, the classification data may include a situation label that is indicative of and/or identifies at least one situation of at least one radar detection or at least one radar subject with respect to the input data. For example, the system 100, via the first classifier, is operable to generate a normal situation label, an intrusion situation label, and an emergency situation label. The normal situation label is generated when there is no radar subject and/or no input data that constitutes an intrusion or emergency. For example, the normal situation label may be generated when the input data is determined to be relatively static. The intrusion situation label is generated when at least one radar subject and/or input data is classified as an intrusion. The emergency situation label is generated when the input data includes at least one radar subject and/or input data is classified as an emergency situation (e.g., a medical emergency, an accident, a fight, etc.). The system 100, via the first classifier, is configured to generate more situation labels or less situation labels than that discussed above depending upon a number of factors associated with that vehicle 10.

At phase 1006, according to an example, the system 100 transmits the classification data from each first classifier to a second classifier. The second classifier includes one or more software systems (and/or hardware systems) to classify the input data (e.g., a set of classification data from the set of first classifiers along with any relevant/applicable data if available) and generate output data (e.g., classification data used as a basis for the system response) based on its classification of that input data. The second classifier may include one or more machine learning systems. The one or more machine learning systems may include one or more machine learning models. For example, the classifier may include logistic regression, support vector machine (SVM), decision trees, random forests, eXtreme Gradient Boosting (XGBoost), convolutional neural network (CNN), random neural network (RNN), a long short-term memory (LSTM), a transformer, an artificial neural network, any classification technology, or any number and combination thereof. Additionally or alternatively, the second classifier may include one or more classification models, via software technology and/or hardware technology, which are rule-based, policy-driven, and/or developed such that a training phase and/or training data is not necessary to generate the classification data.

At phase 1008, according to an example, the system 100 generates output data via the second classifier. More specifically, as shown in FIG. 10, the system 100, via the second classifier, is configured to receive classification data from each first classifier of the set of first classifiers. The set of first classifiers may include one or more first classifiers. The second classifier may also receive other relevant data or other applicable data relating to in-vehicle sensing and classification. As a non-limiting example, for instance, the control system 110 and the second classifier may receive data relating to a position of a particular radar sensor 120 associated with the classification data, a log of prior classification data from a particular radar sensor 120, any relevant data, or any number and combination thereof. Upon receiving at least the classification data from the set of first classifiers as input data, the control system 110 and the second classifier are configured to generate the output data (i.e., classification data) based on the classification data from the set of first classifiers, thereby improving the accuracy and reliability of the classification data by relying on classification data based on different radar sensors 120 at different positions within the vehicle 10 (e.g., FIG. 7, FIG. 8, etc.). This feature is advantageous in a number of situations, such as when the second classifier generates classification data that is more weighted or more reliant on classification data from a first radar sensor 120 than classification data from a second radar sensor 120, for example, when that second radar sensor 120 provides inaccurate classification data due to a malfunction in that second radar sensor 120. Also, as an advantage, the system 100 is configured to provide a combined classification view with respect to combined regions of coverage associated with a combination of radar sensors 120. In this regard, the second classifier is configured to determine and generate classification data, which serves as basis for the system response at phase 1010.

The second classifier is configured to generate output data that includes classification data. As an example, for instance, the classification data includes class data with at least one class label that is indicative of and/or identifies at least one radar detection or at least one radar subject with respect to the input data. More specifically, as a non-limiting example, for instance, the system 100, via the second classifier, is operable to generate (i) an animate label when the radar subject is classified as being animate and (ii) an inanimate label when the radar subject is classified as being inanimate. Additionally or alternatively, the system 100, via the second classifier, is operable to generate (i) an adult label when the radar subject is classified as being an adult (ii) a child label when the radar subject is classified as being a child, and (iii) a baby label when the radar subject is classified as being a baby. Additionally or alternatively, the system 100, via the second classifier, is operable to generate (i) an adult label when the radar subject is classified as being an adult, (ii) a child label when the radar subject is classified as being a child, and, (iii) a baby label when the radar subject is classified as being a baby, and (iv) a pet label when the radar subject is classified as being a pet. Additionally or alternatively, the system 100, via the second classifier, is operable to generate (i) a human label when the radar subject is classified as being a human, (ii) a pet label when the radar subject is classified as being a pet, and (iii) an inanimate label when the radar subject is classified as being inanimate. Additionally or alternatively, the system 100, via the second classifier, is operable to generate (i) an adult label when the radar subject is classified as being an adult, (ii) a child label when the radar subject is classified as being a child, (iii) a baby label when the radar subject is classified as being a baby, (iv) a pet label when the radar subject is classified as being a pet, (v) a backpack label when the radar subject is classified as a backpack, luggage, a bag, or the like, (vi) baby car seat label when the radar subject is classified as a baby car seat, (vii) a box label when the radar subject is classified as being a box or package. The system 100, via the second classifier, is configured to generate more class labels or less class labels indicative of radar subjects than that discussed above depending upon a number of factors associated with that vehicle 10.

Additionally or alternatively to the class label, for instance, the classification data may include a situation label that is indicative of and/or identifies at least one situation of at least one radar detection or at least one radar subject with respect to the input data. For example, the system 100, via the second classifier, is operable to generate a normal situation label, an intrusion situation label, and an emergency situation label. The normal situation label is generated when there is no radar subject and/or no input data that constitutes an intrusion or emergency. For example, the normal situation label may be generated when the input data is determined to be relatively static. The intrusion situation label is generated when at least one radar subject and/or input data is classified as an intrusion. The emergency situation label is generated when the input data includes at least one radar subject and/or input data is classified as an emergency situation (e.g., a medical emergency, an accident, a fight, etc.). The system 100, via the second classifier, is configured to generate more situation labels or less situation labels than that discussed above depending upon a number of factors associated with that vehicle 10.

At phase 1010, according to an example, the system 100 generates a system response and/or control data for activating a system response based on the classification data, which includes class data with at least the class label. In addition, the system 100 is configured to generate other applicable data, such as location data (e.g. positions of radar subjects inside the vehicle 10), headcount data (e.g., number of humans inside the vehicle 10, number of pets inside the vehicle 10, number of children inside the vehicle 10, etc.), inventory data (e.g., number and/or names of objects inside the vehicle 10), or any supplemental data regarding the classification data, the vehicle interior (e.g. cabin temperature, etc.), the vehicle 10 itself, any relevant data (e.g., weather data, map data, etc.), or any combination thereof. In this regard, the system 100 is may also take into account various applicable data while generating the system response based on the classification data.

The control system 110 is operable to generate a system response, which includes or more actions relating to a sensing state inside the vehicle 10 or around one or more predetermined regions of the vehicle 10 as indicated by the classification data. For example, the system response may include generating an alert notification when the class label indicates that an animate subject (e.g. child, baby, pet, human, etc.) is in the vehicle 10 when the vehicle 10 has been parked for a predetermined time period. The system response may include generating an alert notification and/or activating an alarm when the situation label indicates that there is an intrusion situation or an emergency situation. The alert notification may include transmitting a message (e.g., email, text message, voice message, etc.), via communication technology (e.g., phone, computer, etc.), to the appropriate entity (e.g., vehicle owner, vehicle driver, vehicle passenger, emergency responder, police, medical responder, etc.). The alarm may include activation of an alarm (e.g., auditory alarm, visual alarm, etc.) of the vehicle 10 or another communication device (e.g., mobile phone) when the situation label indicates an intrusion situation or emergency situation.

The system response may include actions relating to one or more components of the vehicle 10. In this regard, the one or more components may include an electronic component, a computer component, a mechanical component, or any number and combination thereof. For example, the system 100 is configured to generate control data for a system response, which includes controlling deployment of an airbag associated with a seat inside the vehicle 10 based on the class data of that seat. More specifically, for instance, the system response includes activating or enabling deployment of an airbag associated with a seat when the class data indicates or suggests that the radar subject located at the seat is a human (e.g., a human, an adult, etc.). Also, the system response includes deactivating or disabling deployment of an airbag associated with a seat inside the vehicle when the class data indicates or suggests that the radar subject at that seat is not human (e.g., box, backpack, etc.). As another example, the system response may include activating a seatbelt reminder alert when the class label indicates or suggests that a human (e.g., human, an adult, child, baby, etc.) is located at a seat when a seatbelt of the seat is not fastened. The aforementioned system responses are examples of the various actions that may be taken based on the output data of the classifier. The system 100 is not limited to these system responses, as the system 100 may generate a number of other system responses based on the classification data, which may be enhanced by other applicable data (e.g., such as location data to specify that the radar subject is in the middle rear seat of the vehicle 10). Also, the system 100 may generate more than one system response based on the classification data. For example, the system 100 may be configured to generate an alert notification (e.g., text message, email, phone call, etc.) to one or more predetermined entities (e.g., vehicle owner, emergency responder, etc.) and generate an audible alarm (e.g., vehicle alarm system) when the class label indicates that the radar subject is a human and the situation label indicates that the situation is classified as an intrusion or an emergency.

Figure 11:
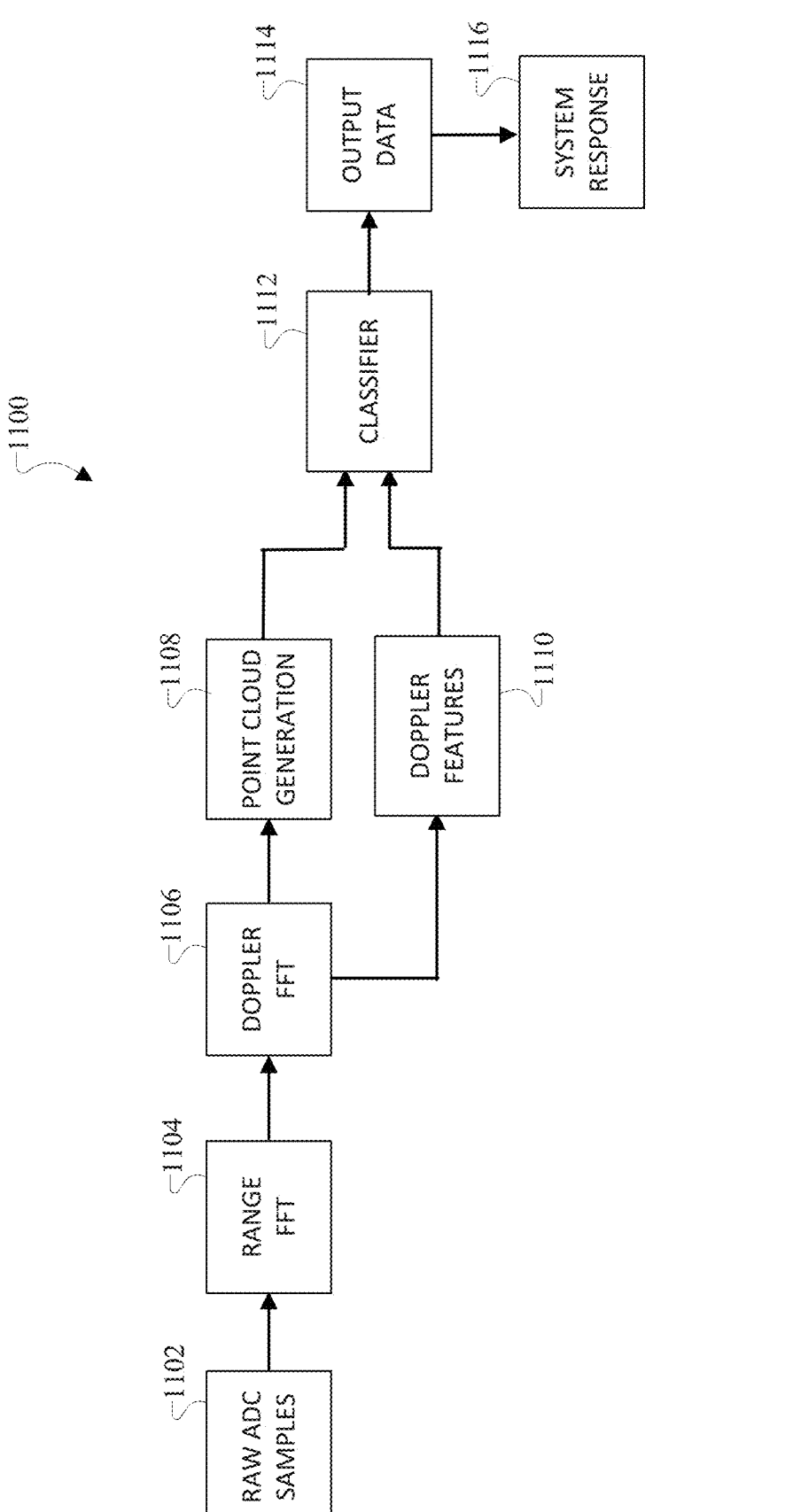
FIG. 11 is a flow diagram of a third example of a process for in-vehicle sensing and classification with FMCW radar according to an example embodiment of this disclosure.

FIG. 11 illustrates a pipeline 1100 with a number of phases, which include a number of operations that are performed by one or more processors of the system 100 based on FMCW radar. The pipeline 1100 is not limited to the phases shown in FIG. 11. In this regard, the pipeline 1100 may include more phases or less phases than that shown in FIG. 11 provided that the system 100 is operable to perform the functions as described herein.

At phase 1102, according to an example, the system 100 obtains raw radar samples via one or more radar sensors 120. More specifically, for example, the radar sensor 120 is configured to transmit radar transmission signals and receive radar reflection signals for FMCW radar. In each of these cases, the signal frequency is increasing or decreasing (e.g., linearly increasing/decreasing) and is known as a chirp 1402 (FIG. 14). In this regard, the radar sensor 120 is operable to transmit one or more radar transmission signals as one or more chirps 1402. Also, the radar sensor 120 is operable to receive one or more radar reception signals as one or more chirps 1402. For example, the radar sensor 120 is configured to transmit a chirp 1402 as the radar transmission signal, and then receive a reflected chirp 1402 as the radar reception signal. In this regard, the radar reception signal may be a delayed version of the radar transmission signal.

The basic unit of radar data, which is transmitted and received by the radar sensor 120, may be referred to as a frame 1400 (FIG. 14). A frame 1400 includes a number of chirps 1402, as defined in a radar configuration file. For example, each frame 1400 may include a plurality of chirps 1402. The frame 1400 is defined based on a number of radar transmission signals, a number of radar reception signals, a number of chirp loops, a number of digital samples per chirp 1402, any suitable feature, or any number and combination thereof. Also, the radar sensor 120 includes a mixer to mix the radar transmission signal and the radar reception signal to generate an IF signal. In addition, the radar sensor 120 includes an ADC that converts the radar reception signals to digital signals.

At phase 1104, according to an example, the system 100 generates range data (e.g., "range-FFT data") by performing a fast Fourier transform (FFT) on the raw ADC samples or the digital signals. As aforementioned, each frame 1400 includes a set of chirps 1402. In this regard, the system 100 is configured to generate range data by performing FFT on each chirp 1402 of a set of chirps of a frame 1400. For example, in FIG. 14, with respect to the first frame 1400, the system 100 is configured to generate range data by performing FFT on a first chirp 1402 of that first frame 1400. In addition, the system 100 is configured to generate range data by performing FFT on a second chirp 1402 of that first frame 1400. In this regard, the system 100 is configured to continue to generate range data for the first frame 1400 by performing FFT on each remaining chirp 1402 of the set of chirps 1402 for that first frame 1400. Also, as indicated in the example shown in FIG. 14, the range data for a particular frame 1400 may be represented as a matrix 1406 with respect to range and chirp index.

In addition, the system 100 is configured to determine that a location of at least one peak in the frequency spectrum corresponds to a range of at least one object. The system 100 is operable to calculate a distance of the reflecting object relative to the radar sensor 120 via $$d = \frac{cfT_c}{2B},$$

where d represents the distance of the reflecting object with respect to the radar sensor 120, c represents the speed of light, f represents a frequency of the digital signal, $T_C$ represents a duration of a chirp 1402, and B represents a bandwidth of the chirp 1402. The system 100 is configured to calculate a range resolution via $$d_{res} = \frac{c}{2B},$$

where $d_{res}$ represents the range resolution, c represents the speed of light, and B represents bandwidth of the chirp 1402. Upon obtaining this range information, the system 100 uses the range data at phase 1106.

At phase 1106, according to an example, the system 100 generates Doppler data (e.g., "Doppler-FFT data") using the range data (e.g., the range-FFT data). More specifically, the system 100 performs FFT on the range data (e.g., the range-FFT data) to generate the Doppler data (e.g., "Doppler-FFT data"). For example, the system 100 is configured to perform FFT along a chirp index for each range bin 1404 of a particular frame 1400. Referring to FIG. 14, as a non-limiting example, the system 100 generates Doppler data (e.g., Doppler data of Doppler bin 1408) by performing FFT on a set of range data (e.g., range data of range bin 1404) corresponding to a set of chirps 1402 of different chirp indices of a particular frame 1400 (e.g., the first frame 1400). Also, as an example, in FIG. 14, the Doppler data for a particular frame 1400 may be represented as a matrix 1410 with respect to range and velocity. The Doppler data includes information about the dynamics and/or dynamic features of a target environment, such as an interior region of the vehicle 10. For example, the system 100 is configured to compute the Doppler velocity resolution (i.e., $V_{res}$) via $$V_{res} = \frac{\lambda}{2T_f},$$

where $\lambda$ represents a wavelength and $T_f$ represents a period of the frame. The system 100 then uses the Doppler data to generate point cloud data, as discussed at phase 1108 and Doppler feature data, as discussed at phase 1110.

At phase 1108, according to an example, the system 100 generates point cloud data using Doppler data. The point cloud data includes a set of data points in space. For example, the set of data points may represent a radar subject (e.g., a target). The point cloud data includes coordinate data of at least one radar subject. For example, the coordinate data may be in (x, y, z) form with respect to an x-axis, a y-axis, and a z-axis. The system 100 is operable to generate point cloud data based on the range data (e.g., distance d) and angle data (e.g., elevation angle φ and azimuth angle θ). The system 100 calculates the elevation angle φ based on a phase difference between elevation receiving antennas after obtaining the Doppler data. The system 100 is configured to extract the shape data of the radar subject and activity level data of the radar subject based on the point cloud data of the radar subject.

At phase 1110, according to an example, the system 100 uses the Doppler data to extract and/or generate Doppler features. More specifically, the system 100 is configured to obtain Doppler data (e.g., Doppler-FFT data) across a set of frames 1400. That is, the system 100 extracts and/or generates Doppler features based on Doppler data from multiple frames 1400. As non-limiting examples, the Doppler features may include FFT energy data, heatmap data, peak features, dimension reduction data, transformation features, any relevant Doppler information, or any number and combination thereof.

At phase 1112, according to an example, the system 100 concatenates the point cloud data and Doppler features. In this regard, for instance, the system 100 provides the concatenation as a multi-dimension matrix. The system 100 provides the multi-dimension matrix as input data to a classifier. The classifier includes one or more software systems (and/or hardware systems) to classify the input data and/or generate classification data. For example, the classifier may include one or more machine learning systems. The one or more machine learning systems may include one or more machine learning models. For example, the classifier may include logistic regression, SVM, decision trees, random forests, XGBoost, CNN, RNN, LSTM, a transformer, an artificial neural network, any classification technology, or any number and combination thereof. Additionally or alternatively, the classifier may include one or more classification models, via software technology and/or hardware technology, which are rule-based, policy-driven, and/or developed such that a training phase and/or training data is not necessary to generate the classification data.

At phase 1114, according to an example, the system 100 generates output data via the classifier. In this regard, for example, the classifier is configured to generate output data that includes classification data. As an example, for instance, the classification data includes class data with at least one class label that is indicative of and/or identifies at least one radar detection or at least one radar subject with respect to the input data. More specifically, as a non-limiting example, for instance, the system 100, via the classifier, is operable to generate (i) an animate label when the radar subject is classified as being animate and (ii) an inanimate label when the radar subject is classified as being inanimate. Additionally or alternatively, the system 100, via the classifier, is operable to generate (i) an adult label when the radar subject is classified as being an adult, (ii) a child label when the radar subject is classified as being a child, and (iii) a baby label when the radar subject is classified as being a baby. Additionally or alternatively, the system 100, via the classifier, is operable to generate (i) an adult label when the radar subject is classified as being an adult, (ii) a child label when the radar subject is classified as being a child, (iii) a baby label when the radar subject is classified as being a baby, and (iv) a pet label when the radar subject is classified as being a pet. Additionally or alternatively, the system 100, via the classifier, is operable to generate (i) a human label when the radar subject is classified as being a human, (ii) a pet label when the radar subject is classified as being a pet, and (iii) an inanimate label when the radar subject is classified as being inanimate. Additionally or alternatively, the system 100, via the classifier, is operable to generate (i) an adult label when the radar subject is classified as being an adult, (ii) a child label when the radar subject is classified as being a child, (iii) a baby label when the radar subject is classified as being a baby (iv) a pet label when the radar subject is classified as being a pet, (v) a backpack label when the radar subject is classified as a backpack, luggage, a bag, or the like, (vi) a baby car seat label when the radar subject is classified as a baby car seat, (vii) a box label when the radar subject is classified as being a box or package. The system 100, via the classifier, is configured to generate more class labels or less class labels indicative of radar subjects than that discussed above depending upon a number of factors associated with that vehicle 10.

Additionally or alternatively to the class label, for instance, the classification data may include a situation label that is indicative of and/or identifies at least one situation of at least one radar detection or at least one radar subject with respect to the input data. For example, the system 100, via the classifier, is operable to generate a normal situation label, an intrusion situation label, and an emergency situation label. The normal situation label is generated when there is no radar subject and/or no input data (e.g., activity level data, velocity data, etc.) that constitutes an intrusion or emergency. For example, the normal situation label may be generated when the input data is determined to be relatively static (or a relatively low dynamic level), which may be determined by no activity level or low activity level. The intrusion situation label is generated when at least one radar subject and/or input data (e.g., activity data, velocity data, etc.) is classified as an intrusion. The emergency situation label is generated when the input data includes at least one radar subject and/or input data (e.g., activity data, velocity data, etc.) is classified as an emergency situation (e.g., a medical emergency, an accident, a fight, etc.). The system 100, via the classifier, is configured to generate more situation labels or less situation labels than that discussed above depending upon a number of factors associated with that vehicle 10.

At phase 1116, according to an example, the system 100 generates a system response and/or control data for activating a system response based on the classification data, which includes class data with at least the class label. In addition, the system 100 is configured to generate other applicable data, such as location data (e.g. positions of radar subjects inside the vehicle 10), headcount data (e.g., number of humans inside the vehicle 10, number of pets inside the vehicle 10, number of children inside the vehicle 10, etc.), inventory data (e.g., number and/or names of objects inside the vehicle 10), or any supplemental data regarding the classification data, the vehicle interior (e.g. cabin temperature, etc.), the vehicle 10 itself, any relevant data (e.g., weather data, map data, etc.), or any combination thereof. In this regard, the system 100 is may also take into account various applicable data while generating the system response based on the classification data.

The control system 110 is operable to generate a system response, which includes or more actions relating to a sensing state inside the vehicle 10 or around one or more predetermined regions of the vehicle 10 as indicated by the classification data. For example, the system response may include generating an alert notification when the class label indicates that an animate subject (e.g. child, baby, pet, human, etc.) is in the vehicle 10 when the vehicle 10 has been parked for a predetermined time period. The system response may include generating an alert notification and/or activating an alarm when the situation label indicates that there is an intrusion situation or an emergency situation. The alert notification may include transmitting a message (e.g., email, text message, voice message, etc.), via communication technology (e.g., phone, computer, etc.), to the appropriate entity (e.g., vehicle owner, vehicle driver, vehicle passenger, emergency responder, police, medical responder, etc.). The alarm may include activation of an alarm (e.g., auditory alarm, visual alarm, etc.) of the vehicle 10 or another communication device (e.g., mobile phone) when the situation label indicates an intrusion situation or emergency situation.

The system response may include actions relating to one or more components of the vehicle 10. In this regard, the one or more components may include an electronic component, a computer component, a mechanical component, or any number and combination thereof. For example, the system 100 is configured to generate control data for a system response, which includes controlling deployment of an airbag associated with a seat inside the vehicle 10 based on the class data of that seat. More specifically, for instance, the system response includes activating or enabling deployment of an airbag associated with a seat when the class data indicates or suggests that the radar subject located at the seat is a human (e.g., a human, an adult, etc.). Also, the system response includes deactivating or disabling deployment of an airbag associated with a seat inside the vehicle when the class data indicates or suggests that the radar subject at that seat is not human (e.g., box, backpack, etc.). As another example, the system response may include activating a seatbelt reminder alert when the class label indicates or suggests that a human (e.g., human, an adult, child, baby, etc.) is located at a seat when a seatbelt of the seat is not fastened. The aforementioned system responses are examples of the various actions that may be taken based on the output data of the classifier. The system 100 is not limited to these system responses, as the system 100 may generate a number of other system responses based on the classification data, which may be enhanced by other applicable data (e.g., such as location data to specify that the radar subject is in the middle rear seat of the vehicle 10). Also, the system 100 may generate more than one system response based on the classification data. For example, the system 100 may be configured to generate an alert notification (e.g., text message, email, phone call, etc.) to one or more predetermined entities (e.g., vehicle owner, emergency responder, etc.) and generate an audible alarm (e.g., vehicle alarm system) when the class label indicates that the radar subject is a human and the situation label indicates that the situation is classified as an intrusion or an emergency.

Figure 12:
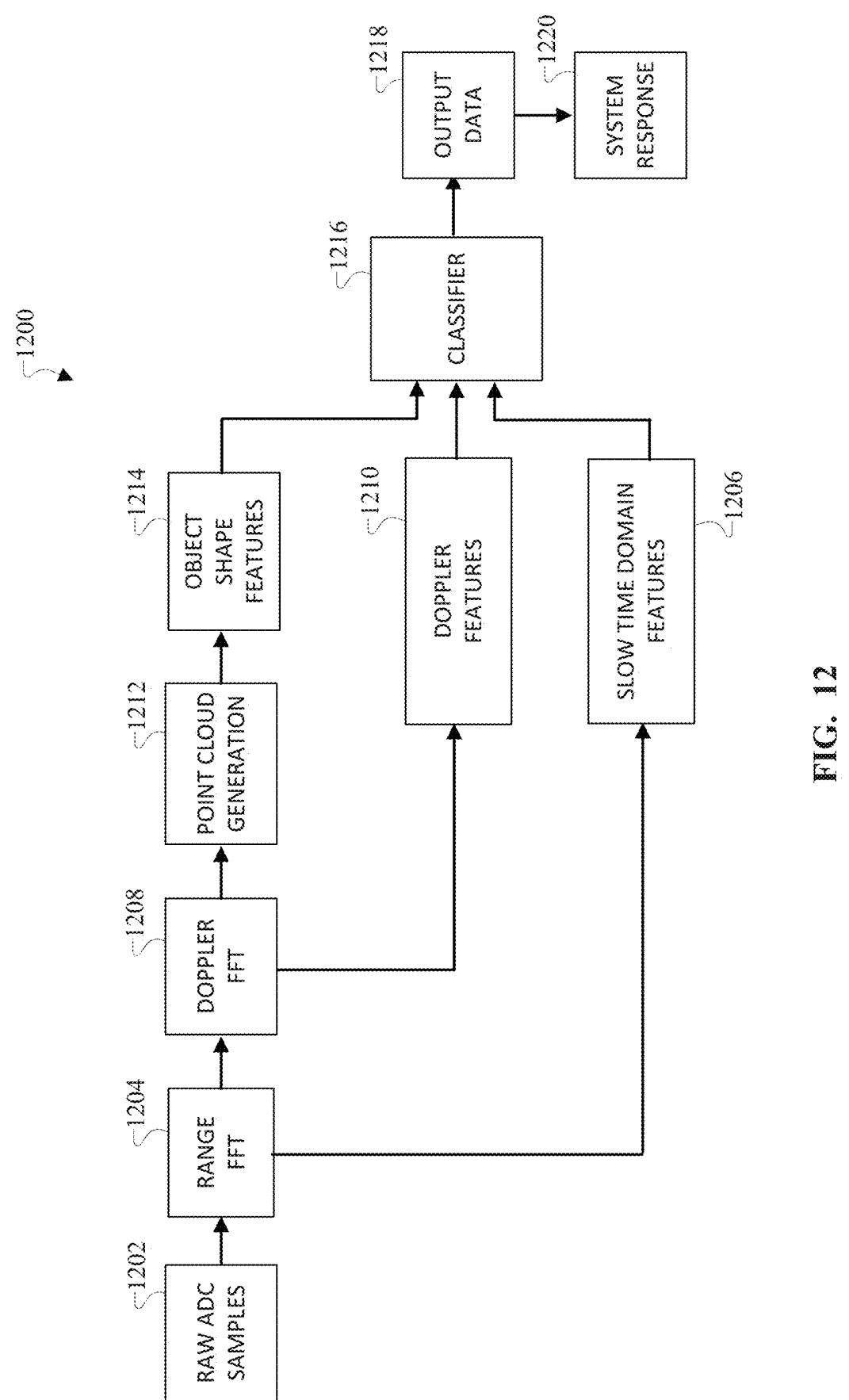
FIG. 12 is a flow diagram of a fourth example of a process for in-vehicle sensing and classification with FMCW radar according to an example embodiment of this disclosure.

FIG. 12 illustrates a flow diagram of the system 100 according to an example embodiment. The flow diagram is illustrated as a pipeline 1200 with several phases, which include a number of operations that are performed by one or more processors of the system 100 based on FMCW radar. The pipeline 1200 is not limited to the phases shown in FIG. 12. In this regard, the pipeline 1200 may include more phases or less phases than that shown in FIG. 12 provided that the system 100 is operable to perform the functions as described herein.

At phase 1202, according to an example, the system 100 obtains raw radar samples via one or more radar sensors 120. More specifically, for example, the radar sensor 120 is configured to transmit radar transmission signals and receive radar reflection signals for FMCW radar. In each of these cases, the signal frequency is increasing or decreasing (e.g., linearly increasing/decreasing) and is known as a chirp 1402 (FIG. 14). In this regard, the radar sensor 120 is operable to transmit one or more radar transmission signals as one or more chirps 1402. Also, the radar sensor 120 is operable to receive one or more radar reception signals as one or more chirps 1402. For example, the radar sensor 120 is configured to transmit a chirp 1402 as the radar transmission signal, and then receive a reflected chirp 1402 as the radar reception signal. In this regard, the radar reception signal may be a delayed version of the radar transmission signal.

The basic unit of radar data, which is transmitted and received by the radar sensor 120, may be referred to as a frame 1400 (FIG. 14). A frame 1400 includes a number of chirps 1402, as defined in a radar configuration file. For example, each frame 1400 may include a plurality of chirps 1402. The frame 1400 is defined based on a number of radar transmission signals, a number of radar reception signals, a number of chirp loops, a number of digital samples per chirp 1402, any suitable feature, or any number and combination thereof. Also, the radar sensor 120 includes a mixer to mix the radar transmission signal and the radar reception signal to generate an IF signal. In addition, the radar sensor 120 includes an ADC that converts the radar reception signals to digital signals.

At phase 1204, according to an example, the system 100 generates range data (e.g., "range-FFT data") by performing FFT on the raw ADC samples or the digital signals. As aforementioned, each frame 1400 includes a set of chirps 1402. In this regard, the system 100 is configured to generate range data by performing FFT on each chirp 1402 of a set of chirps of a frame 1400. For example, in FIG. 14, with respect to the first frame 1400, the system 100 is configured to generate range data by performing FFT on a first chirp 1402 of that first frame 1400. In addition, the system 100 is configured to generate range data by performing FFT on a second chirp 1402 of that first frame 1400. In this regard, the system 100 is configured to continue to generate range data for the first frame 1400 by performing FFT on each remaining chirp 1402 of the set of chirps 1402 for that first frame 1400. Also, as indicated in the example shown in FIG. 14, the range data for a particular frame 1400 may be represented as a matrix 1406 with respect to range and chirp index.

In addition, the system 100 is configured to determine that a location of at least one peak in the frequency spectrum corresponds to a range of at least one object. The system 100 is operable to calculate a distance of the reflecting object relative to the radar sensor 120 via $$d = \frac{cfT_c}{2B},$$

where d represents the distance of the reflecting object with respect to the radar sensor 120, c represents the speed of light, f represents a frequency of the digital signal, $T_C$ represents a duration of a chirp 1402, and B represents a bandwidth of the chirp 1402. The system 100 is configured to calculate a range resolution via $$d_{res} = \frac{c}{2B},$$

where $d_{res}$ represents the range resolution, c represents the speed of light, and B represents bandwidth of the chirp 1402. Upon obtaining this range information, the system 100 uses the range data at phase 1206 and phase 1208, respectively.

Figure 15:
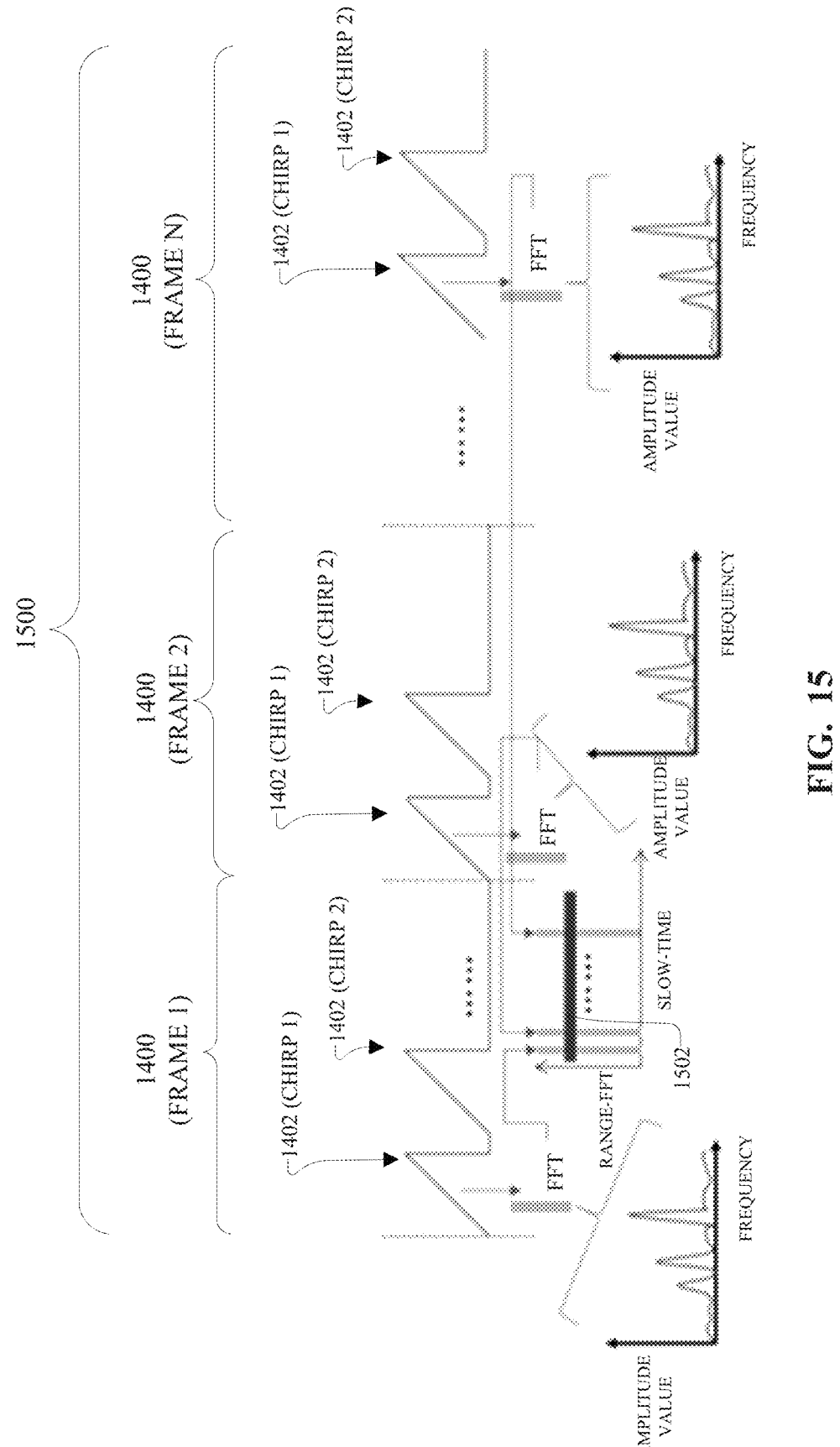
FIG. 15 is a conceptual diagram that shows a non-limiting example of the generation of range data and the generation of slow-time domain features according to an example embodiment of this disclosure.

At phase 1206, according to an example, the system 100 generates slow-time domain features using the range data (e.g., range-FFT data) over a predetermined time window 1500. The predetermined time window 1500 may refer to a time period, which includes or is defined by a predetermined number of frames 1400. In this regard, the slow-time domain features are generated based on a plurality of range data from a plurality of frames 1400. More specifically, the system 100 is configured to obtain the corresponding range data (e.g., range-FFT data) for a particular chirp 1402 associated with a particular chirp index (e.g., the third chirp) from each frame 1400 of a set of frames 1400. For example, in FIG. 15, the set of frames 1400 include a predetermined number of frames 1400 in which 'N' represents the total number of frames 1400. FIG. 15 also shows a non-limiting example in which the system 100 obtains the range-FFT data of a particular chirp 1402, associated with a particular ordinal number within a frame 1400, for each of the frames of the predetermined time window 1500. More specifically, in this example, the system 100 obtains the range-FFT data corresponding to a first chirp 1402 of a first frame 1400, the range-FFT data corresponding to a first chirp 1402 of a second frame 1400, and so forth for each first chirp 1402 of each frame 1400 within the predetermined time window 1500. In addition, the system 100 is configured to generate at least one target bin 1502 across the predetermined time window 1500 to extract slow-time domain features, as shown in FIG. 15. In this regard, for example, the system 100 is configured to select and use one or more target bins that correspond to one or more peaks (local or global maximum values) of range-FFT amplitude values. The system 100 is configured to select and use one or more target bins based on variation levels of one or more peaks of range-FFT amplitude values. The system 100 is configured to select and use one or more target bins, which are predetermined based on a layout of an environment with measurements relating to a distance from a target of interest to a radar sensor 120. The system 100 is configured to select and use one or more target bins based on a comparison between information relating to a current snapshot of the environment and information relating to a pre-captured static/empty profile snapshot of the environment. The process to generate slow-time domain features may involve target detections and feature calculations using one or more target bins 1502. The slow-time domain features provide information (e.g., phase data and/or vital signs data) regarding a reflection of a radar subject (or target) as obtained via the target bin 1502, which extends across each one of the set of frames 1400 within a predetermined time window 1500.

At phase 1208, according to an example, the system 100 generates Doppler data (e.g., "Doppler-FFT data") using the range data (e.g., the range-FFT data). More specifically, the system 100 performs FFT on the range data (e.g., the range-FFT data) to generate the Doppler data (e.g., "Doppler-FFT data"). For example, the system 100 is configured to perform FFT along a chirp index for each range bin 1404 of a particular frame 1400. Referring to FIG. 14, as a non-limiting example, the system 100 generates Doppler data (e.g., Doppler data of Doppler bin 1408) by performing FFT on a set of range data (e.g., range data of range bin 1404) corresponding to a set of chirps 1402 of different chirp indices of a particular frame 1400 (e.g., the first frame 1400). Also, as an example, in FIG. 14, the Doppler data for a particular frame 1400 may be represented as a matrix 1410 with respect to range and velocity. The Doppler data includes information about the dynamics and/or dynamic features of a target environment, such as an interior region of the vehicle 10. For example, the system 100 is configured to compute the Doppler velocity resolution (i.e., $V_{res}$) via $$V_{res} = \frac{\lambda}{2T_f},$$

where $\lambda$ represents a wavelength and $T_f$ represents a period of the frame. The system 100 then uses the Doppler data to generate Doppler feature data, as discussed at phase 1210, and point cloud data, as discussed at phase 1212.

At phase 1210, according to an example, the system 100 uses the Doppler data to extract and/or generate Doppler features. More specifically, the system 100 is configured to obtain Doppler data (e.g., Doppler-FFT data) across a set of frames 1400. That is, the system 100 extracts and/or generates Doppler features based on Doppler data from multiple frames 1400. As non-limiting examples, the Doppler features may include FFT energy data, heatmap data, peak features, dimension reduction data, transformation features, any relevant Doppler information, or any number and combination thereof.

At phase 1212, according to an example, the system 100 generates point cloud data using the Doppler data. The point cloud data includes a set of data points in space. For example, the set of data points may represent a radar subject (e.g., a target). The point cloud data includes coordinate data of at least one radar subject. For example, the coordinate data may be in (x, y, z) form with respect to an x-axis, a y-axis, and a z-axis. The system 100 is operable to generate point cloud data based on the range data (e.g., distance d) and angle data (e.g., elevation angle φ and azimuth angle θ). The system 100 calculates the elevation angle φ based on a phase difference between elevation receiving antennas after obtaining the Doppler data. The system 100 is configured to extract the shape data of the radar subject and activity level data of the radar subject based on the point cloud data of the radar subject.

At phase 1214, according to an example, the system 100 extracts object shape feature data using the point cloud data. The object shape feature data includes at least shape data of a radar detection and/or a radar subject. The object shape feature data includes coordinate data. Upon generating and extracting the object shape data, the system 100 provides this object shape data to the classifier at phase 1216.

At phase 1216, according to an example, the system 100 concatenates the object shape features, the Doppler features, the slow-time domain features, or any number and combination thereof. In this regard, the system 100 is configured to formulate one or more feature vectors that includes at least the object shape features, the Doppler features, the slow-time domain features, or any number and combination thereof. More specifically, for example, the system 100 provides the concatenation as a multi-dimension matrix. The system 100 provides the multi-dimension matrix as input data to the classifier.

The classifier includes one or more software systems (and/or hardware systems) to classify the input data and/or generate classification data. For example, the classifier may include one or more machine learning systems. The one or more machine learning systems may include one or more machine learning models. For example, the classifier may include logistic regression, SVM, decision trees, random forests, XGBoost, CNN, RNN, LSTM, a transformer, an artificial neural network, any classification technology, or any number and combination thereof. Additionally or alternatively, the classifier may include one or more classification models, via software technology, which are rule-based, policy-driven, and/or developed such that a training phase and/or training data is not necessary to generate the classification data.

At phase 1218, according to an example, the system 100 generates output data via the classifier. In this regard, for example, the classifier is configured to generate output data that includes classification data. As an example, for instance, the classification data includes class data with at least one class label that is indicative of and/or identifies at least one radar detection or at least one radar subject with respect to the input data. More specifically, as a non-limiting example, for instance, the system 100, via the classifier, is operable to generate (i) an animate label when the radar subject is classified as being animate and (ii) an inanimate label when the radar subject is classified as being inanimate. Additionally or alternatively, the system 100, via the classifier, is operable to generate (i) an adult label when the radar subject is classified as being an adult, (ii) a child label when the radar subject is classified as being a child, and (iii) a baby label when the radar subject is classified as being a baby. Additionally or alternatively, the system 100, via the classifier, is operable to generate (i) an adult label when the radar subject is classified as being an adult, (ii) a child label when the radar subject is classified as being a child, (iii) a baby label when the radar subject is classified as being a baby, and (iv) a pet label when the radar subject is classified as being a pet. Additionally or alternatively, the system 100, via the classifier, is operable to generate (i) a human label when the radar subject is classified as being a human, (ii) a pet label when the radar subject is classified as being a pet, and (iii) an inanimate label when the radar subject is classified as being inanimate. Additionally or alternatively, the system 100, via the classifier, is operable to generate (i) an adult label when the radar subject is classified as being an adult, (ii) a child label when the radar subject is classified as being a child, (iii) a baby label when the radar subject is classified as being a baby, (iv) a pet label when the radar subject is classified as being a pet, (v) a backpack label when the radar subject is classified as a backpack, luggage, a bag, or the like (vi) baby car seat label when the radar subject is classified as a baby car seat, (vii) a box label when the radar subject is classified as being a box or package. The system 100, via the classifier, is configured to generate more class labels or less class labels indicative of radar subjects than that discussed above depending upon a number of factors associated with that vehicle 10.

Additionally or alternatively to the class label, for instance, the classification data may include a situation label that is indicative of and/or identifies at least one situation of at least one radar detection or at least one radar subject with respect to the input data. For example, the system 100, via the classifier, is operable to generate a normal situation label, an intrusion situation label, and an emergency situation label. The normal situation label is generated when there is no radar subject and/or no input data (e.g., activity level data, velocity data, etc.) that constitutes an intrusion or emergency. For example, the normal situation label may be generated when the input data is determined to be relatively static (or a relatively low dynamic level), which may be determined by no activity level or low activity level. The intrusion situation label is generated when at least one radar subject and/or input data (e.g., activity data, velocity data, etc.) is classified as an intrusion. The emergency situation label is generated when the input data includes at least one radar subject and/or input data (e.g., activity data, velocity data, etc.) is classified as an emergency situation (e.g., a medical emergency, an accident, a fight, etc.). The system

100, via the classifier, is configured to generate more situation labels or less situation labels than that discussed above depending upon a number of factors associated with that vehicle 10.

At phase 1220, according to an example, the system 100 generates a system response and/or control data for activating a system response based on the classification data, which includes class data with at least the class label. In addition, the system 100 is configured to generate other applicable data, such as location data (e.g. positions of radar subjects inside the vehicle 10), headcount data (e.g., number of humans inside the vehicle 10, number of pets inside the vehicle 10, number of children inside the vehicle 10, etc.), inventory data (e.g., number and/or names of objects inside the vehicle 10), or any supplemental data regarding the classification data, the vehicle interior (e.g. cabin temperature, etc.), the vehicle 10 itself, any relevant data (e.g., weather data, map data, etc.), or any combination thereof. In this regard, the system 100 is may also take into account various applicable data while generating the system response based on the classification data.

The control system 110 is operable to generate a system response, which includes or more actions relating to a sensing state inside the vehicle 10 or around one or more predetermined regions of the vehicle 10 as indicated by the classification data. For example, the system response may include generating an alert notification when the class label indicates that an animate subject (e.g., child, baby, pet, human, etc.) is in the vehicle 10 when the vehicle 10 has been parked for a predetermined time period. The system response may include generating an alert notification and/or activating an alarm when the situation label indicates that there is an intrusion situation or an emergency situation. The alert notification may include transmitting a message (e.g., email, text message, voice message, etc.), via communication technology (e.g., phone, computer, etc.), to the appropriate entity (e.g., vehicle owner, vehicle driver, vehicle passenger, emergency responder, police, medical responder, etc.). The alarm may include activation of an alarm (e.g., auditory alarm, visual alarm, etc.) of the vehicle 10 or another communication device (e.g., mobile phone) when the situation label indicates an intrusion situation or emergency situation.

The system response may include actions relating to one or more components of the vehicle 10. In this regard, the one or more components may include an electronic component, a computer component, a mechanical component, or any number and combination thereof. For example, the system 100 is configured to generate control data for a system response, which includes controlling deployment of an airbag associated with a seat inside the vehicle 10 based on the class data of that seat. More specifically, for instance, the system response includes activating or enabling deployment of an airbag associated with a seat when the class data indicates or suggests that the radar subject located at the seat is a human (e.g., a human, an adult, etc.). Also, the system response includes deactivating or disabling deployment of an airbag associated with a seat inside the vehicle when the class data indicates or suggests that the radar subject at that seat is not human (e.g., box, backpack, etc.). As another example, the system response may include activating a seatbelt reminder alert when the class label indicates or suggests that a human (e.g., human, an adult, child, baby, etc.) is located at a seat when a seatbelt of the seat is not fastened. The aforementioned system responses are examples of the various actions that may be taken based on the output data of the classifier. The system 100 is not limited to these system responses, as the system 100 may generate a number of other system responses based on the classification data, which may be enhanced by other applicable data (e.g., such as location data to specify that the radar subject is in the middle rear seat of the vehicle 10). Also, the system 100 may generate more than one system response based on the classification data. For example, the system 100 may be configured to generate an alert notification (e.g., text message, email, phone call, etc.) to one or more predetermined entities (e.g., vehicle owner, emergency responder, etc.) and generate an audible alarm (e.g., vehicle alarm system) when the class label indicates that the radar subject is a human and the situation label indicates that the situation is classified as an intrusion or an emergency.

Figure 13:
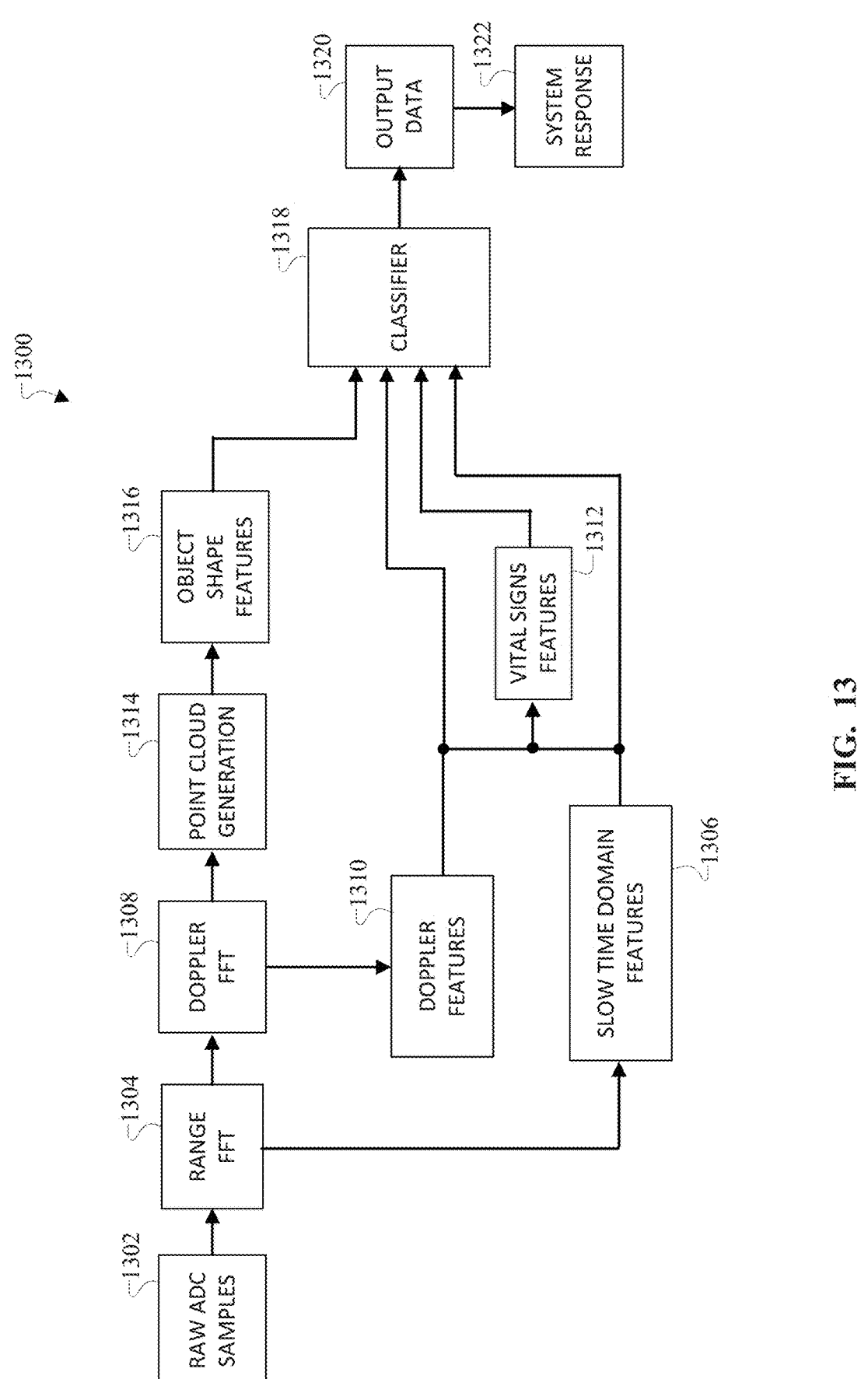
FIG. 13 is a flow diagram of a fifth example of a process for in-vehicle sensing and classification with FMCW radar according to an example embodiment of this disclosure.

FIG. 13 illustrates a flow diagram of the system 100 according to an example embodiment. The flow diagram is illustrated as a pipeline 1300 with several phases, which include a number of operations that are performed by one or more processors of the system 100 based on FMCW radar. The pipeline 1300 is not limited to the phases shown in FIG. 13. In this regard, the pipeline 1300 may include more phases or less phases than that shown in FIG. 13 provided that the system 100 is operable to perform the functions as described herein.

At phase 1302, according to an example, the system 100 obtains raw radar samples via one or more radar sensors 120. More specifically, for example, the radar sensor 120 is configured to transmit radar transmission signals and receive radar reflection signals for FMCW radar. In each of these cases, the signal frequency is increasing or decreasing (e.g., linearly increasing/decreasing) and is known as a chirp 1402. In this regard, the radar sensor 120 is operable to transmit one or more radar transmission signals as one or more chirps 1402. Also, the radar sensor 120 is operable to receive one or more radar reception signals as one or more chirps 1402. For example, the radar sensor 120 is configured to transmit a chirp 1402 as the radar transmission signal, and then receive a reflected chirp 1402 as the radar reception signal. In this regard, the radar reception signal may be a delayed version of the radar transmission signal.

The basic unit of radar data, which is transmitted and received by the radar sensor 120, may be referred to as a frame 1400 (FIG. 14). A frame 1400 includes a number of chirps 1402, as defined in a radar configuration file. For example, each frame 1400 may include a plurality of chirps 1402. The frame 1400 is defined based on a number of radar transmission signals, a number of radar reception signals, a number of chirp loops, a number of digital samples per chirp 1402, any suitable feature, or any number and combination thereof. Also, the radar sensor 120 includes a mixer to mix the radar transmission signal and the radar reception signal to generate an IF signal. In addition, the radar sensor 120 includes an ADC that converts the radar reception signals to digital signals.

At phase 1304, according to an example, the system 100 generates range data (e.g., "range-FFT data") by performing FFT on the raw ADC samples or the digital signals. As aforementioned, each frame 1400 includes a set of chirps 1402. In this regard, the system 100 is configured to generate range data by performing FFT on each chirp 1402 of a set of chirps of a frame 1400. For example, in FIG. 14, with respect to the first frame 1400, the system 100 is configured to generate range data by performing FFT on a first chirp 1402 of that first frame 1400. In addition, the system 100 is configured to generate range data by performing FFT on a second chirp 1402 of that first frame 1400. In this regard, the system 100 is configured to continue to generate range data for the first frame 1400 by performing FFT on each remaining chirp 1402 of the set of chirps 1402 for that first frame 1400. Also, as indicated in the example shown in FIG. 14, the range data for a particular frame 1400 may be represented as a matrix 1406 with respect to range and chirp index.

In addition, the system 100 is configured to determine that a location of at least one peak in the frequency spectrum corresponds to a range of at least one object. The system 100 is operable to calculate a distance of the reflecting object relative to the radar sensor 120 via $$d = \frac{cfT_c}{2B},$$

where d represents the distance of the reflecting object with respect to the radar sensor 120, c represents the speed of light, f represents a frequency of the digital signal, $T_C$ represents a duration of a chirp 1402, and B represents a bandwidth of the chirp 1402. The system 100 is configured to calculate a range resolution via $$d_{res} = \frac{c}{2B},$$

where a $d_{res}$ represents the range resolution, c represents the speed of light, and B represents bandwidth of the chirp 1402. Upon obtaining this range information, the system 100 uses the range data at phase 1306 and phase 1308, respectively.

At phase 1306, according to an example, the system 100 generates slow-time domain features using the range data (e.g., range-FFT data) over a predetermined time window 1500. The predetermined time window 1500 may refer to a time period, which includes or is defined by a predetermined number of frames 1400. In this regard, the slow-time domain features are generated based on a plurality of range data from a plurality of frames 1400. More specifically, the system 100 is configured to obtain the corresponding range data (e.g., range-FFT data) for a particular chirp 1402 associated with a particular chirp index (e.g., the third chirp) from each frame 1400 of a set of frames 1400. For example, in FIG. 15, the set of frames 1400 include a predetermined number of frames 1400 in which 'N' represents the total number of frames 1400. FIG. 15 also shows a non-limiting example in which the system 100 obtains the range-FFT data of a particular chirp 1402, associated with a particular ordinal number within a frame 1400, for each of the frames of the predetermined time window 1500. More specifically, in this example, the system 100 obtains the range-FFT data corresponding to a first chirp 1402 of a first frame 1400, the range-FFT data corresponding to a first chirp 1402 of a second frame 1400, and so forth for each first chirp 1402 of each frame 1400 within the predetermined time window 1500. In addition, the system 100 is configured to generate at least one target bin 1502 across the predetermined time window 1500 to extract slow-time domain features, as shown in FIG. 15. In this regard, for example, the system 100 is configured to select and use one or more target bins that correspond to one or more peaks (local or global maximum values) of range-FFT amplitude values. The system 100 is configured to select and use one or more target bins based on variation levels of one or more peaks of range-FFT amplitude values. The system 100 is configured to select and use one or more target bins, which are predetermined based on a layout of an environment with measurements relating to a distance from a target of interest to a radar sensor 120. The system 100 is configured to select and use one or more target bins based on a comparison between information relating to a current snapshot of the environment and information relating to a pre-captured static/empty profile snapshot of the environment. The process to generate slow-time domain features may involve target detections and feature calculations using one or more target bins 1502. The slow-time domain features provide information (e.g., phase data and/or vital signs data) regarding a reflection of a radar subject (or target) as obtained via the target bin 1502, which extends across each one of the set of frames 1400 within a predetermined time window 1500.

At phase 1308, according to an example, the system 100 generates Doppler data (e.g., "Doppler-FFT data") using the range data (e.g., the range-FFT data). More specifically, the system 100 performs FFT on the range data (e.g., the range-FFT data) to generate the Doppler data (e.g., "Doppler-FFT data"). For example, the system 100 is configured to perform FFT along a chirp index for each range bin 1404 of a particular frame 1400. Referring to FIG. 14, as a non-limiting example, the system 100 generates Doppler data (e.g., Doppler data of Doppler bin 1408) by performing FFT on a set of range data (e.g., range data of range bin 1404) corresponding to a set of chirps 1402 of different chirp indices of a particular frame 1400 (e.g., the first frame 1400). Also, as an example, in FIG. 14, the Doppler data for a particular frame 1400 may be represented as a matrix 1410 with respect to range and velocity. The Doppler data includes information about the dynamics and/or dynamic features of a target environment, such as an interior region of the vehicle 10. For example, the system 100 is configured to compute the Doppler velocity resolution (i.e., $V_{res}$) via $$V_{res} = \frac{\lambda}{2T_f},$$

where $\lambda$ represents a wavelength and $T_f$ represents a period of the frame. The system 100 then uses the Doppler data to generate Doppler feature data, as discussed at phase 1310, and point cloud data, as discussed at phase 1314.

At phase 1310, according to an example, the system 100 uses the Doppler data to extract and/or generate Doppler features. More specifically, the system 100 is configured to obtain Doppler data (e.g., Doppler-FFT data) across a set of frames 1400. That is, the system 100 extracts and/or generates Doppler features based on Doppler data from multiple frames 1400. As non-limiting examples, the Doppler features may include FFT energy data, heatmap data, peak features, dimension reduction data, transformation features, any relevant Doppler information, or any number and combination thereof.

At phase 1312, according to an example, the system 100 generates vital signs features based on the Doppler features, the slow-time domain features, or a combination thereof. The Doppler features provide velocity information of a target or radar subject. The system 100 leverages the velocity information to derive the vital signs features. Also, the slow-time domain features include activity information (e.g. activity level) of a target or radar subject with respect to a slow-time domain or over a longer period of time than the Doppler data. The system 100 leverages the velocity information, the activity information, or a combination thereof to calculate vital signs features. The vital signs features include breathing rate data, heart rate data, or any combination thereof for one or more radar subjects in the target environment (e.g., interior of a vehicle 10). If an animate subject is not detected in the target environment (e.g. interior of a vehicle 10), then the system 100 computes and/or designates the vital sign features to be zero value.

At phase 1314 according to an example, the system 100 generates point cloud data based on the Doppler data. The point cloud data includes a set of data points in space. For example, the set of data points may represent a radar subject (e.g., a target). The point cloud data includes coordinate data of at least one radar subject. For example, the coordinate data may be in (x, y, z) form with respect to an x-axis, a y-axis, and a z-axis. The system 100 is operable to generate point cloud data based on the range data (e.g., distance d) and angle data (e.g., elevation angle φ and azimuth angle θ). The system 100 calculates the elevation angle φ based on a phase difference between elevation receiving antennas after obtaining the Doppler data. The system 100 is configured to extract the shape data of the radar subject and activity level data of the radar subject based on the point cloud data of the radar subject.

At phase 1316, according to an example, the system 100 extracts object shape feature data using the point cloud data. The object shape feature data includes at least shape data of a radar detection and/or a radar subject. The object shape feature data includes coordinate data. Upon generating and extracting the object shape data, the system 100 provides this object shape data to the classifier at phase 1318.

At phase 1318, according to an example, the system 100 concatenates the object shape features, the Doppler features, the vital signs features, the slow-time domain features, or any number and combination thereof. In this regard, the system 100 is configured to formulate one or more feature vectors that includes at least the object shape features, the Doppler features, the vital signs features, the slow-time domain features, or any number and combination thereof. More specifically, for example, the system 100 provides the concatenation as a multi-dimension matrix. The system 100 provides the multi-dimension matrix as input data to a classifier.

The classifier includes one or more software systems (and/or hardware systems) to classify the input data and/or generate classification data. For example, the classifier may include one or more machine learning systems. The one or more machine learning systems may include one or more machine learning models. For example, the classifier may include logistic regression, SVM, decision trees, random forests, XGBoost, CNN, RNN, LSTM, a transformer, an artificial neural network, any classification technology, or any number and combination thereof. Additionally or alternatively, the classifier may include one or more classification models, via software technology, which are rule-based, policy-driven, and/or developed such that a training phase and/or training data is not necessary to generate the classification data.

At phase 1320, according to an example, the system 100 generates output data via the classifier. In this regard, for example, the classifier is configured to generate output data that includes classification data. As an example, for instance, the classification data includes class data with at least one class label that is indicative of and/or identifies at least one radar detection or at least one radar subject with respect to the input data. More specifically, as a non-limiting example, for instance, the system 100, via the classifier, is operable to generate (i) an animate label when the radar subject is classified as being animate and (ii) an inanimate label when the radar subject is classified as being inanimate. Additionally or alternatively, the system 100, via the classifier, is operable to generate (i) an adult label when the radar subject is classified as being an adult, (ii) a child label when the radar subject is classified as being a child, and (iii) a baby label when the radar subject is classified as being a baby. Additionally or alternatively, the system 100, via the classifier, is operable to generate (i) an adult label when the radar subject is classified as being an adult, (ii) a child label when the radar subject is classified as being a child, (iii) a baby label when the radar subject is classified as being a baby, and (iv) a pet label when the radar subject is classified as being a pet. Additionally or alternatively, the system 100, via the classifier, is operable to generate (i) a human label when the radar subject is classified as being a human, (ii) a pet label when the radar subject is classified as being a pet, and (iii) an inanimate label when the radar subject is classified as being inanimate. Additionally or alternatively, the system 100, via the classifier, is operable to generate (i) an adult label when the radar subject is classified as being an adult, (ii) a child label when the radar subject is classified as being a child, (iii) a baby label when the radar subject is classified as being a baby, (iv) a pet label when the radar subject is classified as being a pet, (v) a backpack label when the radar subject is classified as a backpack, luggage, a bag, or the like (vi) baby car seat label when the radar subject is classified as a baby car seat, (vii) a box label when the radar subject is classified as being a box or package. The system 100, via the classifier, is configured to generate more class labels or less class labels indicative of radar subjects than that discussed above depending upon a number of factors associated with that vehicle 10.

Additionally or alternatively to the class label, for instance, the classification data may include a situation label that is indicative of and/or identifies at least one situation of at least one radar detection or at least one radar subject with respect to the input data. For example, the system 100, via the classifier, is operable to generate a normal situation label, an intrusion situation label, and an emergency situation label. The normal situation label is generated when there is no radar subject and/or no input data (e.g., vital signs data, activity level data, velocity data, etc.) that constitutes an intrusion or emergency. For example, the normal situation label may be generated when the input data is determined to be relatively static (or a relatively low dynamic level), which may be determined by no activity level or low activity level. The intrusion situation label is generated when at least one radar subject and/or input data (e.g., vital signs data, activity data, velocity data, etc.) is classified as an intrusion. The emergency situation label is generated when the input data includes at least one radar subject and/or input data (e.g., activity data, velocity data, etc.) is classified as an emergency situation (e.g., a medical emergency, an accident, a fight, etc.). As a non-limiting example, the emergency situation label may be generated when the system 100, via the classifier, detects and classifies a human and a weapon along with the certain activity levels and vital signs data associated therewith inside the vehicle 10. The system 100, via the classifier, is configured to generate more situation labels or less situation labels than that discussed above depending upon a number of factors associated with that vehicle 10.

At phase 1322, according to an example, the system 100 generates a system response and/or control data for activating a system response based on the classification data, which includes class data with at least the class label. In addition, the system 100 is configured to generate other applicable data, such as location data (e.g. positions of radar subjects inside the vehicle 10), headcount data (e.g., number of humans inside the vehicle 10, number of pets inside the vehicle 10, number of children inside the vehicle 10, etc.), inventory data (e.g., number and/or names of objects inside the vehicle 10), or any supplemental data regarding the classification data, the vehicle interior (e.g. cabin temperature, etc.), the vehicle 10 itself, any relevant data (e.g., weather data, map data, etc.), or any combination thereof. In this regard, the system 100 is may also take into account various applicable data while generating the system response based on the classification data.

The control system 110 is operable to generate a system response, which includes or more actions relating to a sensing state inside the vehicle 10 or around one or more predetermined regions of the vehicle 10 as indicated by the classification data. For example, the system response may include generating an alert notification when the class label indicates that an animate subject (e.g. child, baby, pet, human, etc.) is in the vehicle 10 when the vehicle 10 has been parked for a predetermined time period. The system response may include generating an alert notification and/or activating an alarm when the situation label indicates that there is an intrusion situation or an emergency situation. The alert notification may include transmitting a message (e.g., email, text message, voice message, etc.), via communication technology (e.g., phone, computer, etc.), to the appropriate entity (e.g., vehicle owner, vehicle driver, vehicle passenger, emergency responder, police, medical responder, etc.) The alarm may include activation of an alarm (e.g., auditory alarm, visual alarm, etc.) of the vehicle 10 or another communication device (e.g., mobile phone) when the situation label indicates an intrusion situation or emergency situation.

The system response may include actions relating to one or more components of the vehicle 10. In this regard, the one or more components may include an electronic component, a computer component, a mechanical component, or any number and combination thereof. For example, the system 100 is configured to generate control data for a system response, which includes controlling deployment of an airbag associated with a seat inside the vehicle 10 based on the class data of that seat. More specifically, for instance, the system response includes activating or enabling deployment of an airbag associated with a seat when the class data indicates or suggests that the radar subject located at the seat is a human (e.g., a human, an adult, etc.). Also, the system response includes deactivating or disabling deployment of an airbag associated with a seat inside the vehicle when the class data indicates or suggests that the radar subject at that seat is not human (e.g., box, backpack, etc.). As another example, the system response may include activating a seatbelt reminder alert when the class label indicates or suggests that a human (e.g., human, an adult, child, baby, etc.) is located at a seat when a seatbelt of the seat is not fastened. The aforementioned system responses are examples of the various actions that may be taken based on the output data of the classifier. The system 100 is not limited to these system responses, as the system 100 may generate a number of other system responses based on the classification data, which may be enhanced by other applicable data (e.g., such as location data to specify that the radar subject is in the middle rear seat of the vehicle 10). Also, the system 100 may generate more than one system response based on the classification data. For example, the system 100 may be configured to generate an alert notification (e.g., text message, email, phone call, etc.) to one or more predetermined entities (e.g., vehicle owner, emergency responder, etc.) and generate an audible alarm (e.g., vehicle alarm system) when the class label indicates that the radar subject is a human and the situation label indicates that the situation is classified as an intrusion or an emergency.

As described in this disclosure, the system 100 provides a number of advantages and benefits. For example, the system 100 is advantageous in using FMCW radar to operate at higher frequencies, thereby providing greater bandwidth, better performance, and more data than other types of radar that operate at lower frequencies. Also, with FMCW radar, the system 100 is configured to use point cloud data as a basis for generating classification data to determine a sensing state of at least one interior region of the vehicle 10. Other types of radar (e.g., ultra-wideband radar, etc.) may not allow for the generation of point cloud data. Also, by using FMCW radar, the system 100 is configured to distinguish multiple targets (or radar subjects) from each other with resolution. In addition, the system 100 is advantageous in using FMCW radar to provide distance measurements along with speed measurements within a target environment, such as one or more interior regions of a vehicle 10. These measurements may be used to classify one or more targets (or radar subjects), which provide information regarding a sensing state for one or more predetermined regions (e.g., interior regions) of the vehicle 10.

Furthermore, the system 100 is advantageously configured to generate classification data, which classifies one or more targets (or radar subjects) inside the vehicle 10. The generation of classification data is advantageous in various applications relating to "children being left behind" detection, human presence detection, object detection, etc. In this regard, the system 100 provides users with benefits relating to being able to monitor and classify the types of entities (e.g. humans, animals, objects, etc.) in their vehicles 10. Such classification is advantageous in safety and security related applications for vehicles 10. Also, as an advantage, the system 100 is configured to provide an automatic system response concerning the classification data, thereby contributing, for example, to the immediate safety of each animate subject (e.g. humans, children, babies, pets, etc.), the immediate protection of each inanimate subject (e.g., various types of objects), or any number and combination thereof in various situations (e.g., emergency situations, intrusion situations, normal situations, etc.).

The system 100 is advantageous in providing a technical solution that addresses issues relating to, for example, the heat stroke deaths of children, babies, pets, and others when they are left behind in vehicles 10 when these vehicles 10 have been parked for a predetermined period of time. In this regard, the system 100 is configured to prevent such tragedies by generating control data for a system response and/or generating the system response itself (e.g., an alert, a notification, an alarm, any suitable action, or any combination thereof) upon determining that classification data indicates that at least one animate subject (e.g., child, baby, pet, human, etc.) is inside the vehicle 10 when the vehicle 10 has been parked for a predetermined time period. In addition, the system 100 is enabled to provide this technical solution via FMCW radar, which is enabled to work effectively in a number of situations (e.g., when there is poor lighting conditions inside the vehicle, when there is no line-of-sight between the radar sensor and the target, etc.). Also, the system 100 uses FMCW radar, which is less intrusive than camera-based solutions.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally or alternatively, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A method for in-vehicle sensing and classification via frequency modulated continuous wave (FMCW) radar, the method comprising:

transmitting, via a FMCW radar sensor, radar transmission signals;

receiving, via the FMCW radar sensor, radar reflection signals based on the radar transmission signals, the radar reflection signals including a plurality of chirps across a plurality of frames;

converting the radar reflection signals into digital signals;

generating first range data by performing a fast Fourier transform (FFT) on a first set of chirps of a first frame using the digital signals;

generating second range data by performing the FFT on a second set of chirps of a second frame using the digital signals;

generating Doppler data by performing the FFT on at least the first range data and the second range data;

extracting Doppler features from the Doppler data, the Doppler features including a velocity of the radar subject;

generating point cloud data of the radar subject using the Doppler data, the point cloud data including location data of the radar subject;

generating object shape data of the radar subject based on the point cloud data;

concatenating the object shape data and the Doppler features as a multi-dimensional matrix;

generating classification data based on the radar reflection signals to determine a sensing state inside a vehicle, the classification data including class data that classifies a radar subject; and generating a system response to provide an action concerning the sensing state inside the vehicle based on the classification data;

wherein, a classifier generates the classification data based on the point cloud data and the Doppler features, the classifier generates the classification data as output data upon receiving the multi-dimensional matrix as input data, and the classifier includes a machine learning model or a classification model, the classification model performing classification based on a set of rules.

2. The method of claim 1, further comprising:

generating slow-time domain features of the radar subject, the slow-time domain features including phase data of the radar subject that is obtained via a target bin during a predetermined time window, wherein, the target bin includes at least the first range data corresponding to a first chirp of the first frame and the second range data corresponding to the first chirp of the second frame, and the multi-dimensional matrix also includes the slow-time domain features.

3. The method of claim 2, further comprising:

generating vital signs data of the radar subject based on the Doppler features and the slow-time domain features, wherein, the vital signs data includes respiration rate, heart rate, or both the respiration rate and the heart rate, and the multi-dimensional matrix also includes the vital signs data.

4. The method of claim 1, further comprising:

generating slow-time domain features of the radar subject, the slow-time domain features including phase data of the radar subject that is obtained via a target bin during a predetermined time window; and generating vital signs data of the radar subject based on the Doppler features and the slow-time domain features, wherein, the target bin includes at least the first range data corresponding to a first chirp of the first frame and the second range data corresponding to the first chirp of the second frame, the classification data also includes a situation label to identify a type of situation detected inside the vehicle, and the type of situation is classified as an emergency based at least on the vital signs data.

5. The method of claim 1, wherein:

the classification data is generated by a classifier; and the classifier is included as a part of the FMCW radar sensor, an electronic control unit, or both the FMCW radar sensor and the electronic control unit.

6. The method of claim 1, wherein:

the FMCW radar sensor is configured for millimeter wave FMCW radar;

the FMCW radar sensor is disposed inside the vehicle such that the FMCW radar sensor is operable to sense an interior region of the vehicle; and the FMCW radar sensor is located on a ceiling portion of the vehicle.

7. A method for in-vehicle sensing and classification via frequency modulated continuous wave (FMCW) radar, the method comprising:

transmitting, via a FMCW radar sensor, radar transmission signals;

receiving, via the FMCW radar sensor, radar reflection signals based on the radar transmission signals, the radar reflection signals including a plurality of chirps across a plurality of frames;

generating classification data based on the radar reflection signals to determine a sensing state inside a vehicle, the classification data including class data that classifies a radar subject; and generating a system response to provide an action concerning the sensing state inside the vehicle based on the classification data, wherein, the system response includes generating an alert when the class data classifying the radar subject is indicative of an animate subject being inside the vehicle, and the class data and the system response are generated when the vehicle has been parked for a predetermined time period.

8. The method of claim 1, wherein the system response includes activating or deactivating deployment an airbag associated with a seat inside the vehicle based on the class data of the seat.

9. The method of claim 1, wherein:

the system response includes activating a seatbelt reminder alert when the class data classifying the radar subject at a seat inside the vehicle is indicative of a human; and the class data and the system response are generated when a seatbelt of the seat is not fastened.

10. A system comprising:

a transceiver module configured to operate with frequency modulated continuous wave (FMCW) radar, the transceiver module being located inside a vehicle and being operable to (i) transmit radar transmission signals, (ii) receive radar reflection signals based on the radar transmission signals, the radar reflection signals including a plurality of chirps across a plurality of frames, and (iii) convert the radar reflection signals into digital signals; and a processor in data communication with the transceiver module, the processor being operable to perform a method; and a non-transitory computer readable medium in data communication with the processor, the non-transitory computer readable medium including instructions stored thereon that, when executed by the processor, causes the processor to perform the method that includes generating first range data by performing a fast Fourier transform (FFT) on a first set of chirps of a first frame using the digital signals;

generating second range data by performing the FFT on a second set of chirps of a second frame using the digital signals;

generating Doppler data by performing the FFT on at least the first range data and the second range data;

generating point cloud data of a radar subject using the Doppler data, the point cloud data including location data of the radar subject;

extracting Doppler features from the Doppler data, the Doppler features including a velocity of the radar subject;

concatenating the point cloud data and the Doppler features as a multi-dimensional matrix, generating, via a classifier, classification data based on the point cloud data and the Doppler features to determine a sensing state inside the vehicle, the classification data including class data that classifies the radar subject; and generating a system response to provide an action concerning the sensing state of an interior region of the vehicle based on the classification data, wherein, the classifier generates the classification data as output data upon receiving the multi-dimensional matrix as input data, and the classifier includes a machine learning model or a classification model, the classification model performing classification based on a set of rules.

11. The system of claim 10, wherein:

the processor is operable to perform the method that further includes (i) generating object shape data of the radar subject based on the point cloud data, and (ii) concatenating the object shape data and the Doppler features as a multi-dimensional matrix; and the classifier generates the classification data as output data upon receiving the multi-dimensional matrix as input data.

12. The system of claim 11, wherein:

the processor is operable to perform the method that further includes generating slow-time domain features of the radar subject;

the slow-time domain features include at least phase data of the radar subject that is obtained via a target bin during a predetermined time window;

the target bin includes at least the first range data corresponding to a first chirp of the first frame and the second range data corresponding to the first chirp of the second frame; and the multi-dimensional matrix also includes the slow-time domain features.

13. The system of claim 12, wherein:

the processor is operable to perform the method that further includes generating vital signs data of the radar subject based on the Doppler features and the slow-time domain features;

the vital signs data includes respiration rate, heart rate, or both the respiration rate and the heart rate; and the multi-dimensional matrix also includes the vital signs data.

14. The system of claim 10, wherein:

the processor is operable to perform the method that further includes generating slow-time domain features for the radar subject, the slow-time domain features including phase data of the radar subject that is obtained via a target bin during a predetermined time window;

the processor is operable to perform the method that further includes generating vital signs data of the radar subject based on the Doppler features and the slow-time domain features;

the target bin includes at least the first range data corresponding to a first chirp of the first frame and the second range data corresponding to the first chirp of the second frame, and the classification data also includes situation data to identify a type of situation detected inside the vehicle; and the type of situation is classified as an emergency based on the vital signs data.

15. The system of claim 10, wherein:

the system response includes generating an alert when the class data classifying the radar subject is indicative of an animate subject being inside the vehicle; and the class data and the system response are generated when the vehicle has been parked for a predetermined time period.

16. The system of claim 10, wherein the system response includes activating or deactivating deployment an airbag associated with a seat inside the vehicle based on the class data of the seat.

17. The system of claim 10, wherein:

the system response includes activating a seatbelt reminder alert when the class data classifying the radar subject at a seat inside the vehicle is indicative of a human; and the class data and the system response are generated when a seatbelt of the seat is not fastened.

18. The method of claim 7, wherein:

the FMCW radar sensor is configured for millimeter wave FMCW radar; and the FMCW radar sensor is disposed inside the vehicle such that the FMCW radar sensor is operable to sense an interior region of the vehicle.

19. The method of claim 7, further comprising:

generating object shape data of the radar subject based on the point cloud data, and concatenating the object shape data and the Doppler features as a multi-dimensional matrix, wherein, the classifier generates the classification data as output data upon receiving the multi-dimensional matrix as input data, and the classifier includes a machine learning model or a classification model, the classification model performing classification based on a set of rules.

20. The method of claim 19, further comprising:

generating slow-time domain features of the radar subject, the slow-time domain features including phase data of the radar subject that is obtained via a target bin during a predetermined time window, wherein, the target bin includes at least the first range data corresponding to a first chirp of the first frame and the second range data corresponding to the first chirp of the second frame, and the multi-dimensional matrix also includes the slow-time domain features.

\* \* \* \* \*